US011970019B2

(12) United States Patent
Suzuki et al.

(10) Patent No.: US 11,970,019 B2
(45) Date of Patent: Apr. 30, 2024

(54) ENVELOPE PROCESSING APPARATUS AND IMAGE FORMING SYSTEM

(71) Applicants: Nobuyoshi Suzuki, Tokyo (JP); Michitaka Suzuki, Kanagawa (JP); Yuusuke Shibasaki, Tokyo (JP); Takahiro Matsuda, Kanagawa (JP); Atsushi Shinoda, Kanagawa (JP); Shingo Yoshizawa, Kanagawa (JP); Takahiro Watanabe, Kanagawa (JP); Takuya Morinaga, Tokyo (JP)

(72) Inventors: Nobuyoshi Suzuki, Tokyo (JP); Michitaka Suzuki, Kanagawa (JP); Yuusuke Shibasaki, Tokyo (JP); Takahiro Matsuda, Kanagawa (JP); Atsushi Shinoda, Kanagawa (JP); Shingo Yoshizawa, Kanagawa (JP); Takahiro Watanabe, Kanagawa (JP); Takuya Morinaga, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/298,590

(22) Filed: Apr. 11, 2023

(65) Prior Publication Data

US 2023/0331029 A1 Oct. 19, 2023

(30) Foreign Application Priority Data

Apr. 19, 2022 (JP) ................................ 2022-068867

(51) Int. Cl.
*B43M 3/04* (2006.01)
*B41J 3/28* (2006.01)
(Continued)

(52) U.S. Cl.
CPC ................ *B43M 3/045* (2013.01); *B41J 3/28* (2013.01); *B43M 5/042* (2013.01); *G03G 15/6588* (2013.01)

(58) Field of Classification Search
CPC . B43M 3/00; B43M 3/02; B43M 3/04; B43M 3/045; B43M 5/04; B43M 5/042
See application file for complete search history.

(56) References Cited

U.S. PATENT DOCUMENTS 4,720,960 A * 1/1988 Green ...................... B43M 3/04 53/284.3
5,406,771 A * 4/1995 Dronsfield ............ B43M 3/045 53/284.3
(Continued)

FOREIGN PATENT DOCUMENTS

JP 6-143894 5/1994
JP 6-183197 7/1994
JP 2012-121181 6/2012

*Primary Examiner* — Chelsea E Stinson
(74) *Attorney, Agent, or Firm* — IPUSA, PLLC

(57) ABSTRACT

An envelope processing apparatus that inserts an enclosure into an envelope includes an envelope conveyor, a flap opener, an enclosure pusher, and circuitry. The envelope conveyor extends in a vertical direction and conveys the envelope to an enclosing position via an envelope conveyance passage as a passage in which the envelope is conveyed. The flap opener opens a flap of the envelope. The enclosure pusher pushes the enclosure toward an opening of a body of the envelope conveyed to the enclosing position with the flap open. The circuitry changes a pushing amount of the enclosure into the envelope and adjusts the pushing amount based on the opening of the body of the envelope within a specified range from an inside to an outside of the body of the envelope.

8 Claims, 29 Drawing Sheets

(51) Int. Cl.
*B43M 5/04* (2006.01)
*G03G 15/00* (2006.01)

(56) References Cited

U.S. PATENT DOCUMENTS

| | | | | |
|---|---|---|---|---|
| 6,536,184 | B1 * | 3/2003 | Sting | B43M 3/045 53/284.3 |
| 7,398,635 | B2 * | 7/2008 | Fairweather | B43M 3/045 53/284.3 |
| 2011/0064541 | A1 | 3/2011 | Kikkawa et al. | |
| 2012/0153556 | A1 | 6/2012 | Sugiyama et al. | |
| 2013/0113154 | A1 | 5/2013 | Furuhashi et al. | |
| 2013/0154178 | A1 | 6/2013 | Suzuki et al. | |
| 2014/0138896 | A1 | 5/2014 | Yoshida et al. | |
| 2015/0360899 | A1 | 12/2015 | Takahashi et al. | |
| 2016/0340144 | A1 | 11/2016 | Sakano et al. | |
| 2016/0340145 | A1 | 11/2016 | Kunieda et al. | |
| 2016/0360053 | A1 | 12/2016 | Suzuki et al. | |
| 2017/0174465 | A1 | 6/2017 | Morinaga et al. | |
| 2017/0217239 | A1 | 8/2017 | Suzuki et al. | |
| 2017/0305706 | A1 | 10/2017 | Takahashi et al. | |
| 2019/0039406 | A1 * | 2/2019 | Takamura | G03G 15/6594 |
| 2020/0140222 | A1 | 5/2020 | Takahashi et al. | |
| 2020/0307944 | A1 | 10/2020 | Shibasaki et al. | |

* cited by examiner

ENVELOPE PROCESSING APPARATUS AND IMAGE FORMING SYSTEM

CROSS-REFERENCE TO RELATED APPLICATION

This patent application is based on and claims priority pursuant to 35 U.S.C. § 119(a) to Japanese Patent Application No. 2022-068867, filed on Apr. 19, 2022, in the Japan Patent Office, the entire disclosure of which is hereby incorporated by reference herein.

BACKGROUND

Technical Field

Embodiments of the present disclosure relate to an envelope processing apparatus and an image forming system.

Related Art

An enclosing device is known that inserts an enclosure such as a letter into an envelope, and an envelope processing apparatus is known that inserts the enclosure into the envelope and seals the envelope in which the enclosure is inserted. An image forming system is also known that includes an image forming apparatus to form an image onto a sheet as the enclosure, encloses the sheet as the enclosure on which the image is formed into the envelope, and seals the envelope in which the sheet is inserted.

SUMMARY

In an embodiment of the present disclosure, there is provided an envelope processing apparatus that inserts an enclosure into an envelope and includes an envelope conveyor, a flap opener, an enclosure pusher, and circuitry. The envelope conveyor extends in a vertical direction and conveys the envelope to an enclosing position via an envelope conveyance passage as a passage in which the envelope is conveyed. The flap opener opens a flap of the envelope. The enclosure pusher pushes the enclosure toward an opening of a body of the envelope conveyed to the enclosing position with the flap open. The circuitry changes a pushing amount of the enclosure into the envelope and adjusts the pushing amount based on the opening of the body of the envelope within a specified range from an inside to an outside of the body of the envelope.

In another embodiment of the present disclosure, there is provided an image forming system that includes an image forming apparatus and the envelope processing apparatus.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
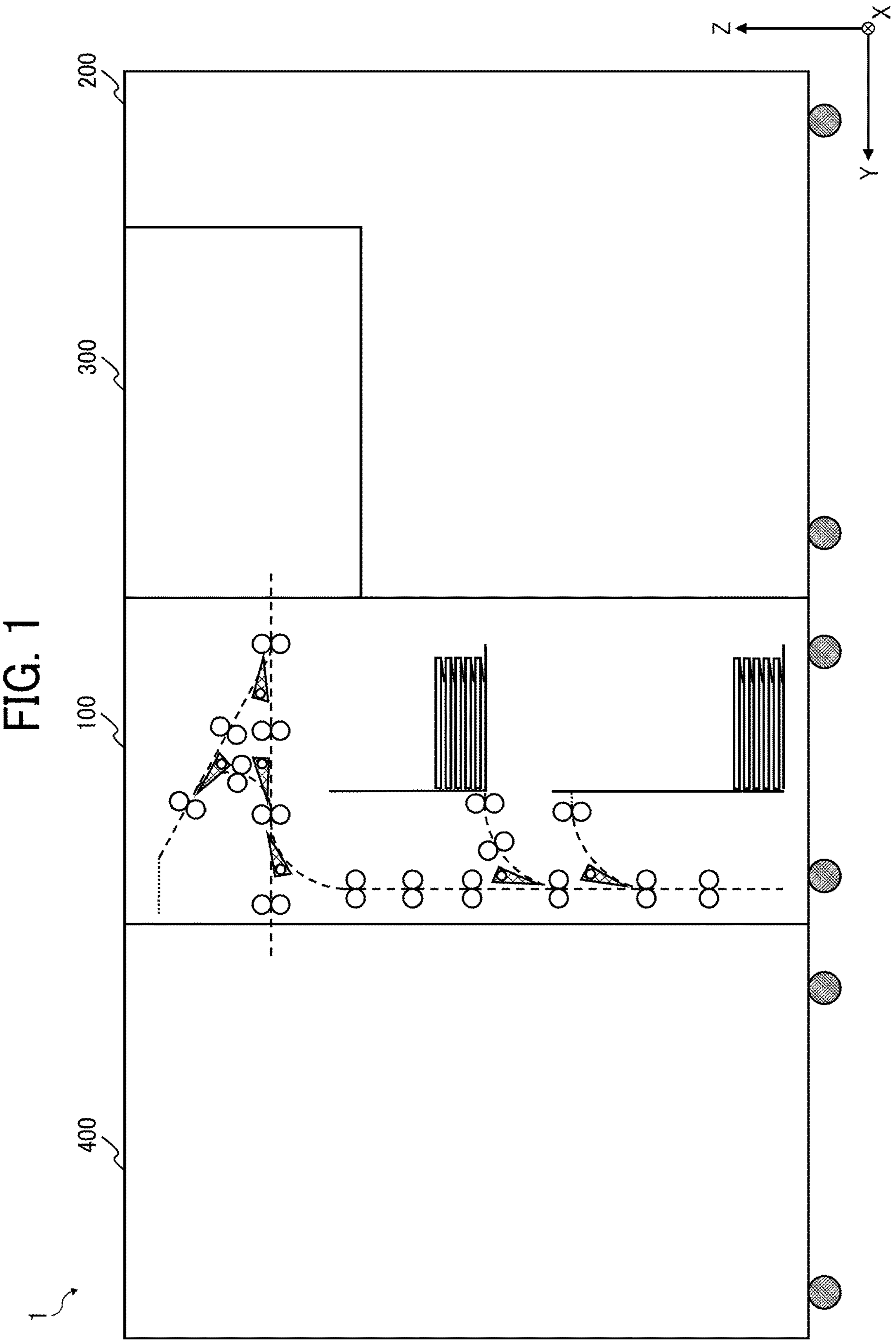
FIG. 1 is a front external view of an enclosing system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

First, an embodiment of the present disclosure is described below. FIG. 1 is a front external view of a print system 1 as an example of an image forming system according to an embodiment of the present disclosure. The print system 1 includes an image forming apparatus 200, a folding apparatus 300 as a sheet processing apparatus that performs folding processing, an envelope processing apparatus 100 that encloses and seals an enclosure, and a post-processing apparatus 400. The print system 1 is also an image forming system according to an embodiment of the present disclosure.

The image forming apparatus 200 is an apparatus that forms an image on a sheet-shaped medium by a specified image forming method and ejects the sheet-shaped medium. The sheet-shaped medium on which the image is formed (hereinafter, simply referred to as a "sheet S") is ejected to the folding apparatus 300.

The folding apparatus 300 performs folding processing on the sheet S ejected from the image forming apparatus 200 based on a setting according to a specified folding type and folding dimension, forms a folded sheet Sf, and ejects the folded sheet Sf. Here, the setting performed in advance includes at least selection of a predetermined folding type and setting of a folding dimension. Note that the folding apparatus 300 may eject the sheet S to the downstream side as it is (without performing folding processing) based on setting.

A setting related to performing or non-performing of the folding processing or a setting used for execution of the folding processing are based on setting information (various adjustment values) notified from the image forming apparatus 200. A mechanism that performs the folding processing adjusts a feed amount of the sheet S based on various adjustment values, forms a crease at a folding position in accordance with the adjustment, and forms the folded sheet Sf. The folded sheet Sf on which the specified folding processing is performed is sent out to the envelope processing apparatus 100.

The folding apparatus 300 performs processing for adjusting a folding dimension so that a trailing end of the folded sheet Sf in an insertion direction in which the folded sheet Sf is inserted into the envelope E in the envelope processing apparatus 100 turns to be the "crease" of the folded sheet Sf.

The envelope processing apparatus 100 performs enclosing processing and sealing processing. In the enclosing processing, the folded sheet Sf, which is conveyed after the folding processing is performed in an apparatus (folding apparatus 300) disposed upstream in an entry direction of the sheet S, is inserted and enclosed into the envelope E. In the sealing processing, the envelope E into which the folded sheet Sf is inserted is sealed. The envelope processing apparatus 100 can convey the folded sheet Sf or the sheet S downstream without enclosing the folded sheet Sf or the sheet S into the envelope E. In this case, the folded sheet Sf or the sheet S is sent out to the post-processing apparatus 400 disposed downstream from the envelope processing apparatus 100. The post-processing apparatus 400 is an apparatus that performs post-processing such as staple processing on the conveyed sheet S.

The envelope processing apparatus 100 performs conveyance processing for enclosing the folded sheet Sf, on which the folding processing has performed, into the envelope E in an appropriate orientation. The envelope processing apparatus 100 also performs processing of adjusting the orientation of the folded sheet Sf in enclosing the folded sheet Sf so that information such as an address formed on the enclosed folded sheet Sf is located at a position where the information can be visually recognized through a transparent window ew formed on the envelope E in advance. This adjustment processing is performed by reversal conveyance processing included in the conveyance processing. Accordingly, the envelope processing apparatus 100 determines whether the orientation of the folded sheet Sf at the time of enclosure is to be reversed from the orientation at the time of entry, based on an image position of the folded sheet Sf at the time of entry and the position of the transparent window ew formed in the envelope E. Then, the conveyance processing and the reversal conveyance processing are performed based on the determination result.

With reference to FIG. 1, a description is given of a "direction" commonly used in the description of embodiments of the present disclosure. As illustrated in FIG. 1, an axis parallel to a placement surface of the print system 1 is defined as a Y axis. An arrangement direction of the apparatuses constituting the print system 1 is along the Y axis. Thus, as illustrated in FIG. 1, an arrow direction of the Y axis is defined as a Y direction. The sheet S on which an image is formed in the image forming apparatus 200 is conveyed in the Y direction, and then conveyed to each apparatus disposed downstream from the image forming apparatus 200 in the Y direction.

Similarly, an axis parallel to the placement surface and orthogonal to the Y axis is defined as an X axis. A depth direction of the print system 1 is an arrow direction of the X axis and is defined as an X direction. An arrow direction of a Z axis orthogonal to the X axis and the Y axis and corresponding to a height direction of the print system 1 is defined as a Z direction. As illustrated in FIG. 1, the envelope processing apparatus 100 has a configuration in which an enclosure is conveyed to a position at which the enclosure is inserted into the envelope E, a configuration in which the enclosure is enclosed, and configurations for sealing the enclosure arranged side by side in the Z direction. Thus, the configurations can downsize plane dimension of the envelope processing apparatus 100 and can be available even in narrow installation space. Also in the following drawings, the same axes are denoted, and the description of the axes is omitted.

Figure 2:
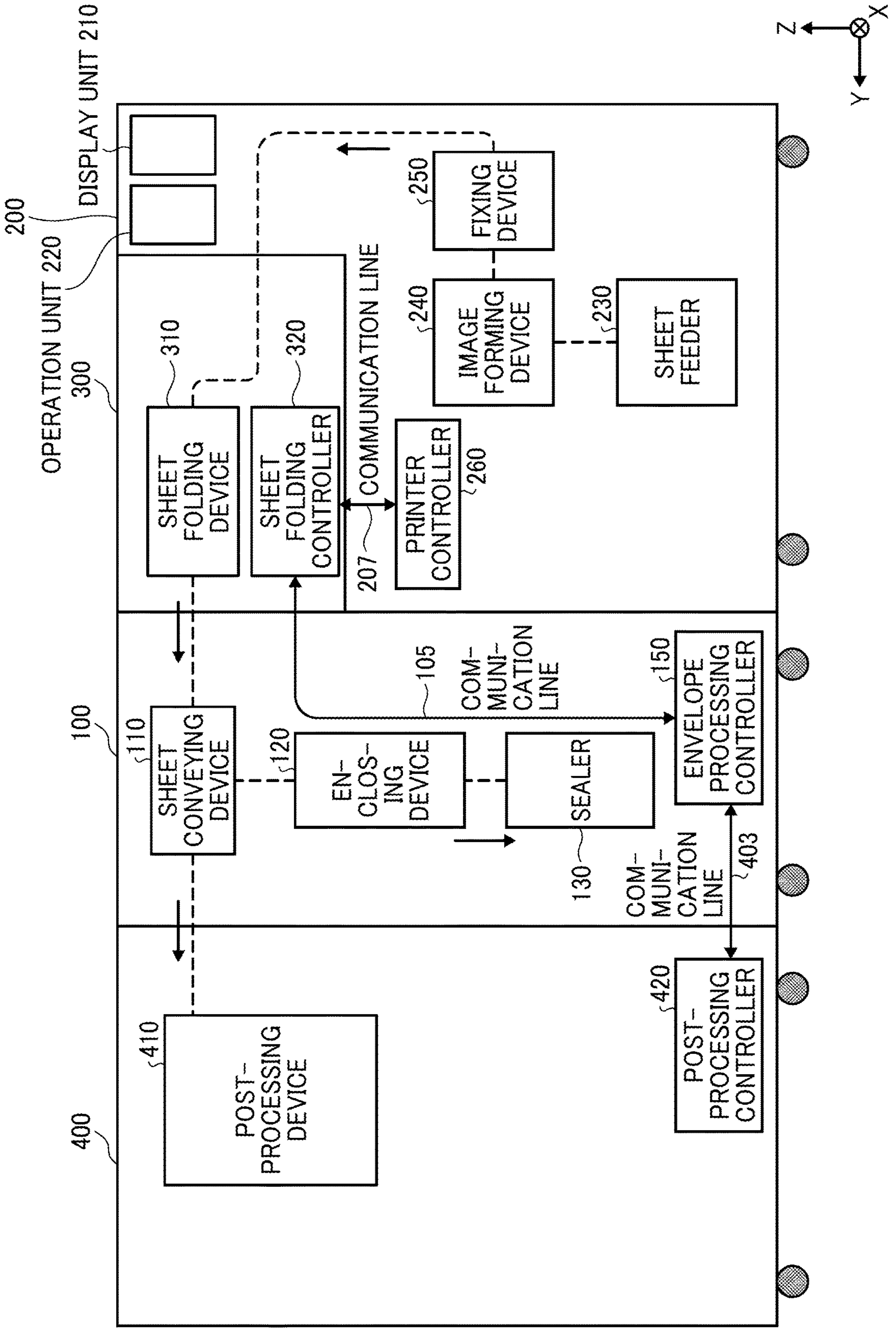
FIG. 2 is a block diagram illustrating a control configuration of the enclosing system of FIG. 1.

With reference to FIG. 2, a description is given of overall functional blocks of the print system 1. In the following descriptions, an enclosure as a medium that is conveyed, and inserted and enclosed in the envelope E is a folded sheet Sf on which an image is formed in the image forming apparatus 200 and on which specified folding processing is performed in the folding apparatus 300. In FIG. 2, movement passages (conveyance passages) of the sheet S and the folded sheet Sf are indicated by dashed lines, and communication lines used for transmitting and receiving signals between functional blocks are indicated by solid lines.

The image forming apparatus 200 is, for example, an apparatus that forms an image on a sheet S by a known electrophotographic process. The image forming apparatus 200 includes a display 210, an operation unit 220, a sheet feeder 230, an image forming device 240, a fixing device 250, and a printer controller 260. Note that the image forming process in the image forming apparatus 200 is not limited to an electrophotographic process and may be an inkjet process in which liquid ink is discharged onto a medium to form an image. In addition, any other suitable process than the above-described image forming process may be used.

The display 210 displays screens for notifying a user of states of various functions and operation contents. The operation unit 220 corresponds to an operation interface with which the user performs setting a processing operation mode or the number of prints to be processed.

The operations performed via the operation unit 220 include, for example, the setting of a type of folding operation (folding type) or a folding dimension to be performed in the folding apparatus 300, and the setting of requiring reverse conveyance when the sheet S is enclosed in the envelope processing apparatus 100. Information on the settings performed via the operation unit 220 is transmitted from the printer controller 260 to a sheet folding controller 320 or an envelope processing controller 150.

The sheet feeder 230 includes a sheet feeding mechanism that stores sheets S, and separates and feeds the sheets S one by one. The image forming device 240 forms a latent image on a photoconductor and transfers an image onto the sheet S. The fixing device 250 fixes the image transferred onto the sheet S. The printer controller 260 controls operations of the above-described functional blocks.

The folding apparatus 300 includes a sheet folding device 310 and the sheet folding controller 320 that controls the entire folding apparatus 300. The sheet folding controller 320 controls folding processing for the sheet S based on a folding type (folding manner) and a folding dimension designated from the printer controller 260 of the image forming apparatus 200 via a communication line 207. The sheet folding controller 320 also controls communication with the printer controller 260, and the envelope processing controller 150 connected downstream from the sheet folding controller 320. The sheet folding device 310 performs folding processing on the sheet S conveyed from the image forming apparatus 200 with the designated folding type (folding manner) and the designated folding dimension, based on control of the sheet folding controller 320. Note that the sheet S may be conveyed to the envelope processing apparatus 100 without being folded in the sheet folding device 310.

There are multiple types of sheet folding devices 310. Embodiments of the sheet folding device 310 that perform different folding manners are described with reference to FIGS. 3A to 3E and FIGS. 4A to 4E. In the following description, the sheet folding device 310 illustrated in FIGS. 3A to 3E is referred to as “type A”. The sheet folding device 310 illustrated in FIGS. 4A to 4E is referred to as “type B”. In FIGS. 3A to 3E and FIGS. 4A to 4E, the sheet S is attached with symbols A. The symbol A represents a printing surface of the sheet S on which an image is formed (hereinafter, also referred to as an “image forming surface Ps”). That is, in the following description, it is assumed that an image forming process is performed on one surface of the sheet S.

As illustrated in FIGS. 3A to 3E, a lower surface of the sheet S in the conveyance direction of the sheet S conveyed from the image forming apparatus 200 to the sheet folding device 310 corresponds to the image forming surface Ps.

Figure 3A:
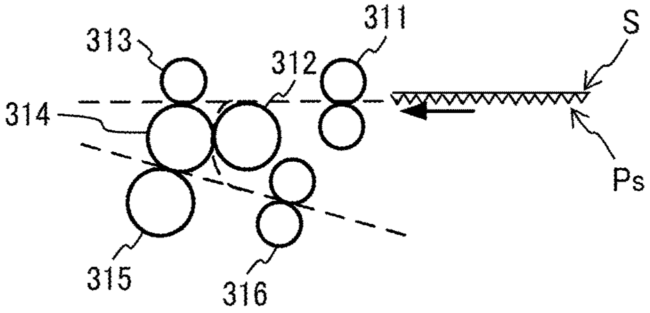
FIGS. 3A to 3E are diagrams illustrating an internal configuration of a sheet processing apparatus applicable to the enclosing system of FIG. 1.

First, as illustrated in FIG. 3A, the sheet S is conveyed from the image forming apparatus 200 toward a conveying roller pair 311.

Figure 3B:
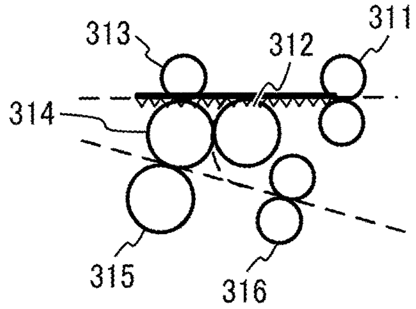

As illustrated in FIG. 3B, the sheet S conveyed downstream by the conveying roller pair 311 is conveyed to a specified position by a first folding roller 312, a first folding conveying roller 313, and a second folding roller 314.

Figure 3C:
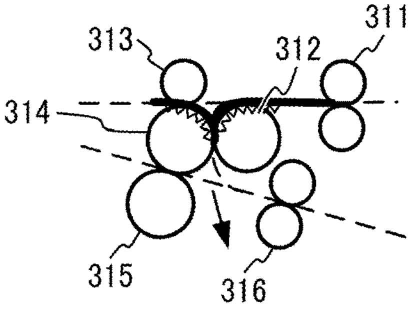

Thereafter, as illustrated in FIG. 3C, the first folding conveying roller 313 and the second folding roller 314 are rotated in reverse to form a first crease on the sheet S.

Figure 3D:
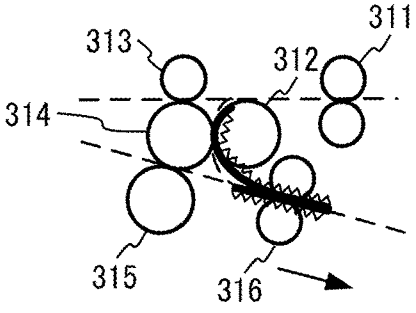

As illustrated in FIG. 3D, the sheet S on which the first crease is formed is conveyed by the first folding roller 312, the second folding roller 314, and a second folding conveying roller pair 316 to a passage different from a passage through which the sheet S enters, and is stopped at a specified position.

Figure 3E:
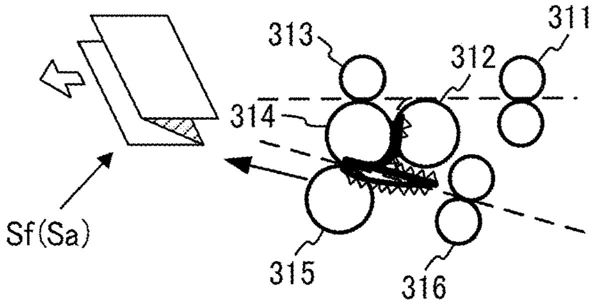

Thereafter, as illustrated in FIG. 3E, the second folding conveying roller pair 316 is rotated in reverse, and a third folding roller 315 is also rotated to convey the sheet S in a downstream direction. By this operation, a second crease is formed. Thus, the folded sheet Sf having outer three creases is completed. In this case, the image forming surface Ps of the folded sheet Sf is positioned on a lower surface of the folded sheet Sf in the conveyance direction.

A description is given of the sheet folding device 310 of type B. In the sheet folding device 310 of type B, as illustrated in FIGS. 4A to 4E, a sheet S conveyed from the image forming apparatus 200 is conveyed in a gravity direction. At this time, it is assumed that the right surface of the sheet S in the conveyance direction is the image forming surface Ps in FIGS. 4A to 4E.

Figure 4A:
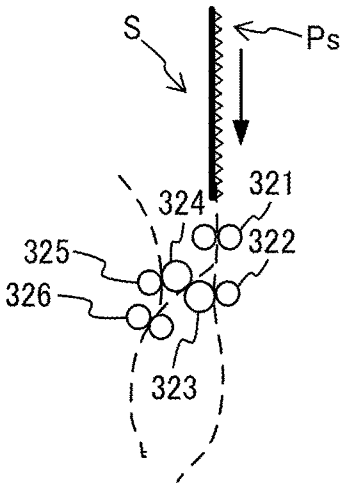
FIGS. 4A to 4E are diagrams illustrating an internal configuration of another sheet processing apparatus applicable to the enclosing system of FIG. 1.

First, as illustrated in FIG. 4A, the sheet S is conveyed from the image forming apparatus 200 toward a first conveying roller pair 321.

Figure 4B:
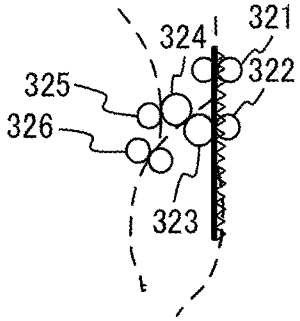

Subsequently, as illustrated in FIG. 4B, the sheet S is conveyed downward to a specified position by the first conveying roller pair 321, a first folding roller 323, and a first folding conveying roller 322, and then stops.

Figure 4C:
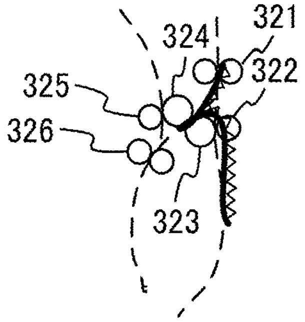

Thereafter, as illustrated in FIG. 4C, the first folding conveying roller 322 and the first folding roller 323 are rotated in reverse, and a second folding roller 324 is rotated to form the first crease.

Figure 4D:
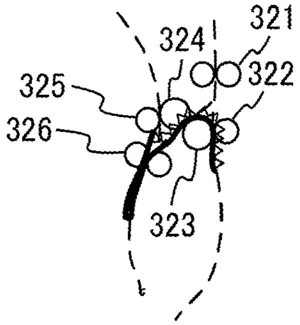
Figure 4E:
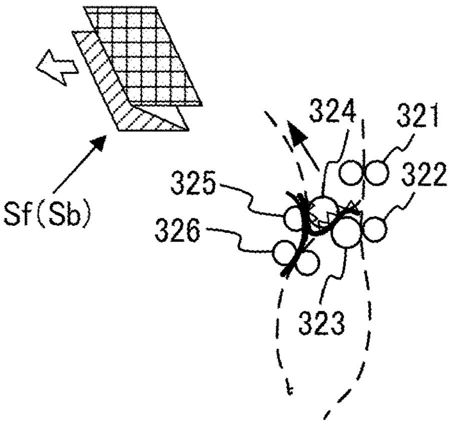

Further, as illustrated in FIG. 4D, a second conveying roller pair 326 is also rotated to convey the sheet S and stop at a specified position.

Thereafter, the second conveying roller pair 326 is rotated in reverse. The folded sheet Sf is conveyed upward by the rotation of a second folding conveying roller 325. The second folding roller 324 and the second folding conveying roller 325 form a second crease. Thus, the outer three creases are completed. In this case, unlike the type A, the image forming surface Ps of the folded sheet Sf is positioned on the upper surface of the sheet S in the conveyance direction unlike in the case of the type A. As described above, even when the same outer three creases are formed by the sheet folding devices 310 of the different types of the type A and the type B, the position of the image forming surface Ps of the folded sheet Sf comes to a different surface with respect to the conveyance direction. The description above is an example in which an image is formed on one surface of the sheet S.

Returning to FIG. 2, a description is given below. The envelope processing apparatus 100 includes a sheet conveying device 110, an enclosing device 120, a sealer 130, and the envelope processing controller 150.

The sheet conveying device 110 performs specified processing on the folded sheet Sf conveyed from the sheet folding device 310 in accordance with a control mode (including, for example, a type of folding manner, a folding dimension, and a position of the image forming surface Ps) transmitted from the sheet folding controller 320 to the envelope processing controller 150 through a communication line 105. The sheet conveying device 110 performs, for example, the conveyance processing for conveying the folded sheet Sf downstream in the conveyance direction or the reversal conveyance processing for reversing ends of the folded sheet Sf in the conveyance direction. The folded sheet Sf is conveyed to the enclosing device 120 or the post-processing apparatus 400 by the conveyance processing or the reversal conveyance processing.

The enclosing device 120 moves the folded sheet Sf to a position where the folded sheet Sf can be enclosed with respect to the envelope E, holds the envelope E in a state where a flap ef for closing an opening for enclosing an enclosure in the envelope E is opened, and performs the enclosing processing of the folded sheet Sf. Note that in the following description related to the envelope E, the structure of the envelope E may be described as being composed of a flap ef for closing an opening, and a body corresponding to a bag part for holding an enclosure inserted from the opening.

The sealer 130 performs processing of ejecting the sealed envelope E to an ejection tray 137 after the flap ef of the envelope E in which the folded sheet Sf is enclosed is closed.

The envelope processing controller 150 controls operations of a plurality of conveying rollers and a plurality of switching claws constituting the sheet conveying device 110, the enclosing device 120, and the sealer 130. The envelope processing controller 150 receives information of the folded sheet Sf (hereinafter, referred to as "enclosing target information") from the printer controller 260 and the sheet folding controller 320, and then, performs control processing on the folded sheet Sf based on the received information.

The control processing for the folded sheet Sf includes "conveyance processing" in which the ends of the folded sheet Sf in the conveyance direction are not reversed from the time of entry and "reversal conveyance processing" in which the ends are reversed. The "enclosing target information" is information related to the sheet S and the folded sheet Sf as an enclosing target, and includes information for determining whether the end of the folded sheet Sf enclosed into the envelope E is the leading end or the trailing end at the time of entry. Examples of the enclosing target information include "folding type information" that defines the type of folding processing performed on the folded sheet Sf.

Examples of operation instruction information from the image forming apparatus 200 that is one of upstream side apparatuses include "reversal necessity information" which defines necessity of the reversal conveyance processing described below. Examples of the operation instruction information also include print surface information indicating an image forming surface on which an image is formed on the folded sheet Sf. Examples of the operation instruction information further include "processing apparatus information" indicating the type (type A or type B) of the sheet folding device 310 that has performed the folding processing.

The post-processing apparatus 400 includes a post-processing device 410 and a post-processing controller 420. The post-processing device 410 executes specified post-processing on the sheet S conveyed from the upstream side under the control of the post-processing controller 420. The post-processing controller 420 controls the post-processing operation in the post-processing controller 420 according to the operation mode transmitted from the printer controller 260, the sheet folding controller 320, and the envelope processing controller 150 through a communication line 403.

The printer controller 260, the sheet folding controller 320, the envelope processing controller 150, and the post-processing controller 420 are connected to each other, and exchange information necessary for control through the communication lines 207, 105, and 403. The controllers 260, 320, 150, and 420 cooperate with each other to share the sheet size and information about the processing mode requested by the user to be performed on the sheet S and the folded sheet Sf. Accordingly, the entirety of the print system 1 shares control information that allows each of the mechanisms described above to perform specified processing with specified timing and a specified process. Accordingly, a pushing-amount adjustor as a unit for adjusting an insertion state (pushing amount) to be described below is constituted by cooperation of the controllers 260, 320, 150, and 420.

In FIGS. 1 and 2, an example in which the post-processing apparatus 400 is coupled to the downstream side of the envelope processing apparatus 100 is illustrated as an example of the configuration of the print system 1. Typical examples of the post-processing apparatus 400 include a finisher that performs stapling processing, a stacker, and a bookbinding machine. The system configuration of the print system 1 may be such a configuration in which the envelope processing apparatus 100 is located on the most downstream side.

Figure 5:
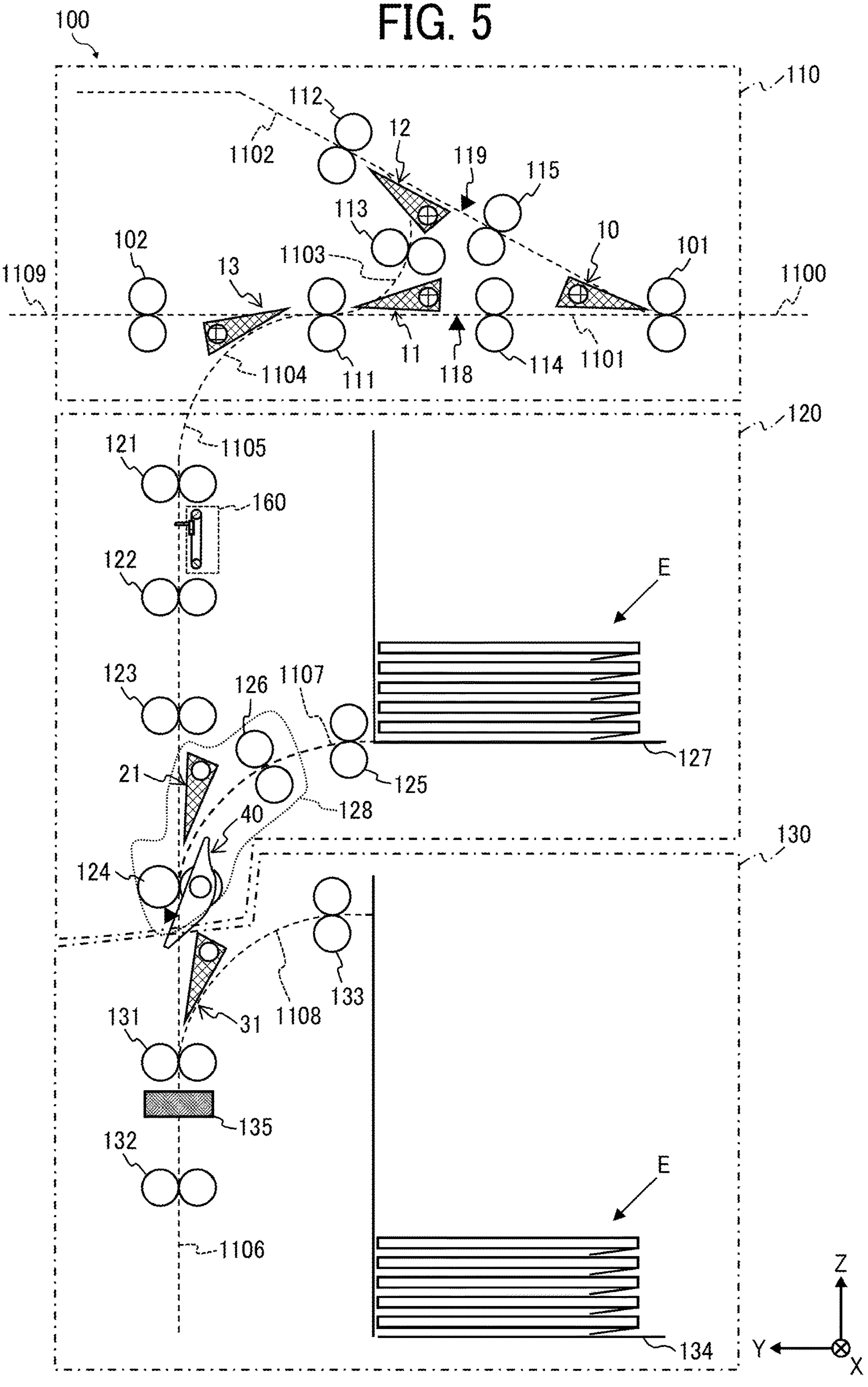
FIG. 5 is a diagram illustrating an internal configuration of an envelope processing apparatus according to an embodiment of the present disclosure.

Next, with reference to FIG. 5, a description is given of conveying roller pairs constituting the sheet conveying device 110, the enclosing device 120, a flap opening mechanism 128, and the sealer 130 disposed in the envelope processing apparatus 100, switching claws that switch the conveyance direction of a conveyance object, and conveyance passages on which these components are arranged.

As illustrated in FIG. 5, the sheet conveying device 110 that also functions as the folding apparatus 300 includes a plurality of conveyance passages distinguished as an entry passage 1100, a first conveyance passage 1101, a second conveyance passage 1102, a switchback conveyance passage 1103, an enclosure conveyance passage 1104 as a fourth conveyance passage, and a sheet exit passage 1109.

An entrance roller pair 101 is disposed in the entry passage 1100. The entry passage 1100 is a passage in which the folded sheet Sf ejected from an apparatus located on the upstream side (for example, the folding apparatus 300) is received. The envelope processing controller 150 receives the enclosing target information as the information related to the folded sheet Sf from the controllers (the printer controller 260 and the sheet folding controller 320) upstream from the envelope processing controller 150 and controls the start and stop of the rotation of the entrance roller pair 101.

A first conveying roller pair 111 serving as a first conveyor and a first intermediate conveying roller pair 114 are disposed in the first conveyance passage 1101 that is one of a plurality of conveyance passages provided on the downstream side of the entrance roller pair 101 and branches off from the entry passage 1100. A first sheet detection sensor 118 as a first medium sensor that detects an end (trailing end) of the conveyed folded sheet Sf is disposed on the first conveyance passage 1101. The first sheet detection sensor 118 is disposed between the first intermediate conveying roller pair 114 and the first conveying roller pair 111.

A second conveying roller pair 112 serving as a second conveyor and a second intermediate conveying roller pair 115 are disposed in the second conveyance passage 1102 that is one of conveyance passages provided on the downstream side of the entrance roller pair 101 and branches from the entry passage 1100 in a direction different from the direction of the first conveyance passage 1101. A second sheet detection sensor 119 as a second medium sensor that detects an end (trailing end) of the conveyed folded sheet Sf is disposed on the second conveyance passage 1102. The second sheet detection sensor 119 is disposed between the second intermediate conveying roller pair 115 and the second conveying roller pair 112.

The sheet conveying device 110 includes the switchback conveyance passage 1103. The switchback conveyance passage 1103 is a conveyance passage that connects a joining position where the conveyance passage joins with the first conveyance passage 1101 at a downstream position of the first conveying roller pair 111 and a branching position where the conveyance passage branches from the second conveyance passage 1102 at an upstream position of the second intermediate conveying roller pair 115. The switchback conveyance passage 1103 switches the conveyance direction of the folded sheet Sf conveyed on the second conveyance passage 1102 in the downstream direction, and the folded sheet Sf is conveyed to the first conveyance passage 1101 by switchback conveyance. A switchback conveying roller pair 113 serving as a third conveyor is disposed in the switchback conveyance passage 1103 serving as a third conveyance passage.

The sheet conveying device 110 includes the sheet exit passage 1109 as a conveyance passage on the downstream side following the first conveyance passage 1101. The sheet exit passage 1109 sends out the sheet S or the folded sheet Sf, which has passed through the sheet conveying device 110, toward the post-processing apparatus 400 on the downstream side. An exit roller pair 102 is disposed in the sheet exit passage 1109.

When enclosing processing to be described below is not performed on the folded sheet Sf conveyed from the folding apparatus 300, the folded sheet Sf passes through the first conveyance passage 1101 from the entry passage 1100 and is ejected to the apparatus on the downstream side via the sheet exit passage 1109. In the following description, processing in which the sheet S or the folded sheet Sf conveyed from the entrance roller pair 101 is conveyed to the exit roller pair 102 via the first conveyance passage 1101 and is further conveyed downstream may be referred to as "normal conveyance processing". The sheet conveying device 110 performs the normal conveyance processing not when an "envelope job" that encloses the sheet S or the folded sheet Sf is performed but when a "print job" is performed that conveys the sheet S or the folded sheet Sf to the post-processing apparatus 400 as it is.

The sheet conveying device 110 includes the enclosure conveyance passage 1104 as a fourth conveyance passage that branches from the first conveyance passage 1101 on the downstream side of the first conveying roller pair 111 and communicates with an enclosing roller pair 121 that holds the envelope E in which the folded sheet Sf is enclosed. As described below, the enclosure conveyance passage 1104 communicates with an envelope conveyance passage 1105.

The sheet conveying device 110 is provided with a branching claw 10 as a brancher at a branching position for conveying the folded sheet Sf from the entry passage 1100 to either the first conveyance passage 1101 or the second conveyance passage 1102. The branching claw 10 switches a conveyance passage between the first conveyance passage 1101 and the second conveyance passage 1102 based on enclosing target information relating to the folded sheet Sf entering the entry passage 1100 so that the branching claw 10 guides the folded sheet Sf to the first conveyance passage 1101 or the second conveyance passage 1102.

The sheet conveying device 110 is provided with a first switching claw 11 as a first switcher at a joining position where the switchback conveyance passage 1103 joins the first conveyance passage 1101. The first switching claw 11 switches between a state in which the folded sheet Sf conveyed from the entry passage 1100 to the first conveyance passage 1101 is conveyed to the first conveying roller pair 111 and a state in which the folded sheet Sf is conveyed from the switchback conveyance passage 1103 to the first conveyance passage 1101.

The sheet conveying device 110 is provided with a second switching claw 12 as a second switcher at a branching position where the switchback conveyance passage 1103 branches from the second conveyance passage 1102. The second switching claw 12 switches between a state in which the folded sheet Sf conveyed from the entry passage 1100 to the second conveyance passage 1102 is conveyed to the second conveying roller pair 112 and a state in which the folded sheet Sf is conveyed in a switchback manner from the second conveyance passage 1102 to the switchback conveyance passage 1103.

The sheet conveying device 110 is provided with a third switching claw 13 as a third switcher at a branching position where the enclosure conveyance passage 1104 branches from the first conveyance passage 1101. The third switching claw 13 switches between a state in which the folded sheet Sf conveyed by the first conveyance passage 1101 is conveyed to the enclosure conveyance passage 1104 and a state in which the folded sheet Sf is conveyed to the sheet exit passage 1109.

The folded sheet Sf conveyed to the first conveyance passage 1101 is conveyed to the first conveying roller pair 111 by the first intermediate conveying roller pair 114. The first conveying roller pair 111 conveys the conveyed folded sheet Sf downstream. When the third switching claw 13 is in a state illustrated in FIG. 5, that is, when the third switching claw 13 opens the enclosure conveyance passage 1104 and closes a conveyance passage that passes through the exit roller pair 102 as a direction in which the folded sheet Sf is conveyed, the folded sheet Sf is conveyed to the enclosure conveyance passage 1104. After the trailing end of the folded sheet Sf conveyed from the first intermediate conveying roller pair 114 to the first conveying roller pair 111 is detected by the first sheet detection sensor 118, the folded sheet Sf turns into the state where the folded sheet Sf has already moved to the enclosure conveyance passage 1104 when the folded sheet Sf is conveyed by a specified distance. When the envelope processing controller 150 determines that the folded sheet Sf has reached the above-described state, the operation of each conveying roller pair rotating in the sheet conveying device 110 is stopped.

A driving source for operating each conveying roller pair included in the envelope processing apparatus 100 individually supplies a driving force to each conveying roller pair.

For example, a motor serving as a driving source corresponding to each conveying roller pair is individually provided. Rotation control of each motor is individually performed. As a result, the control is performed such that a specific conveying roller pair is rotated and the other conveying roller pairs are stopped. A plurality of roller pairs may be driven by a single motor. Even in this case, rotation and non-rotation of each roller (roller pair) may be individually controlled.

The folded sheet Sf conveyed to the second conveyance passage 1102 is conveyed to the second conveying roller pair 112 by the second intermediate conveying roller pair 115. When the trailing end of the conveyed folded sheet Sf is detected by the second sheet detection sensor 119 and conveyed by a specified distance, the second conveying roller pair 112 is temporarily stopped and then rotated in reverse. As a result, the folded sheet Sf is ready to be conveyed to the switchback conveyance passage 1103 in a switchback manner. At this time, before or simultaneously with the reverse rotation of the second conveying roller pair 112, the second switching claw 12 is rotated at a timing at which the trailing end of the folded sheet Sf has passed through the second switching claw 12 (this operation is also determined based on the detection result of the second sheet detection sensor 119). Thus, the second switching claw 12 is switched to a state in which the folded sheet Sf is conveyed to the switchback conveyance passage 1103.

When the folded sheet Sf is guided from the second conveyance passage 1102 to the switchback conveyance passage 1103, the folded sheet Sf is conveyed toward the first conveyance passage 1101 by the switchback conveying roller pair 113.

As illustrated in FIG. 5, the enclosing device 120 also functioning as an enclosing device is provided with the envelope conveyance passage 1105 as a vertical conveyance passage connected to the enclosure conveyance passage 1104 as a fourth conveyance passage disposed in the sheet conveying device 110. The envelope conveyance passage 1105 extends in a direction intersecting with a placement surface (X-Y plane) of the envelope processing apparatus 100, more specifically, in a direction (Z direction) orthogonal to the X-Y plane. In other words, the envelope conveyance passage 1105 is a conveyance passage extending in a substantially vertical direction from the enclosure conveyance passage 1104. As a result, in the envelope processing apparatus 100, the conveyance direction in which the envelope E is conveyed to an enclosing position is the vertical direction as in the envelope conveyance passage 1105.

The envelope E before the enclosure is inserted is placed on an envelope set tray 127. The envelope E placed on the envelope set tray 127 via the envelope conveyance passage 1105 is conveyed from an envelope entry passage 1107, which is described below, to the envelope conveyance passage 1105, and is conveyed to the enclosing position disposed along the envelope conveyance passage 1105.

When the envelope E is conveyed from the envelope entry passage 1107 to the envelope conveyance passage 1105, the flap ef of the envelope E is opened. The envelope E with the flap ef opened is conveyed to the enclosing position. This series of operations is described below.

The sealed envelope E, which has been conveyed to the enclosing position and into which the enclosure has been enclosed, is sealed in a sealing conveyance passage 1106 on the way to an envelope ejection tray 134. The sealed envelope E is conveyed to the envelope ejection tray 134 and ejected. The envelope conveyance passage 1105 is also used as a conveyance passage at the time of ejection.

This series of switching of the conveyance direction of the envelope E is performed by a claw-shaped member that appropriately operates according to the position of the envelope E being conveyed. A roller pair constituting the envelope conveyance passage 1105 switches the conveyance direction depending on the position of the envelope E. Thus, a switchback conveying operation is performed in which the envelope E is conveyed in a direction opposite to the direction in which the envelope E is once conveyed. The enclosure is conveyed to the envelope conveyance passage 1105 directly connected to the enclosure conveyance passage 1104 branched from the first conveyance passage 1101. As a result, a part of the envelope conveyance passage 1105 also functions as a conveyance passage for the enclosure.

As described above, since the configuration that conveys the envelope E for the enclosing operation and the sealing operation and the configuration that conveys the enclosure with respect to the envelope E are arranged in the vertical direction with respect to the placement surface of the envelope processing apparatus 100, the installation area of the envelope processing apparatus 100 can be reduced. The print system 1 including the envelope processing apparatus 100 can also be downsized.

The envelope conveyance passage 1105 includes an envelope holding mechanism that conveys the envelope E to the enclosing position as a specified position and holds the envelope E so that an enclosure is enclosed. The envelope conveyance passage 1105 is connected to the sealing conveyance passage 1106 for performing sealing processing on the envelope E in which the enclosure is enclosed.

A first vertical conveying roller pair 122 serving as an envelope conveyor and a second vertical conveying roller pair 123 as an envelope conveyor for conveying the envelope E to a position where the folded sheet Sf is received are disposed in the envelope conveyance passage 1105. The enclosing roller pair 121 serving as an enclosure conveyor that conveys and supplies an enclosure to the envelope E is disposed above the first vertical conveying roller pair 122 (in the +Z direction) in the envelope conveyance passage 1105.

The enclosing roller pair 121 conveys the enclosure in the enclosing direction (−Z direction) to perform the enclosing operation with respect to the envelope E conveyed to and held at the enclosing position by the first vertical conveying roller pair 122 and the second vertical conveying roller pair 123.

An enclosure pusher 160 is disposed between the enclosing roller pair 121 and the first vertical conveying roller pair 122 and on the side of the envelope conveyance passage 1105 and performs an operation of pushing the trailing end of the enclosure toward the opening of the envelope E during the enclosing operation.

The flap opening mechanism 128 as a flap opener is disposed at a connection position of a conveyance passage extending from the envelope conveyance passage 1105 to the sealing conveyance passage 1106 and a connection position of an envelope entry passage 1107 that conveys the envelope E taken out from the envelope set tray 127 to the envelope conveyance passage 1105. The flap opening mechanism 128 has a configuration for opening the flap ef when the envelope E taken out from the envelope set tray 127 as an envelope holding tray is conveyed to the envelope conveyance passage 1105. The flap opening mechanism 128 also has a configuration for switchback conveyance in which the conveyance direction is switched such that the envelope E with the flap ef opened is conveyed to the enclosing position.

An envelope switchback switching claw 21 serving as a conveying guide in the flap opening mechanism 128 is disposed at a junction where the envelope conveyance passage 1105 and the envelope entry passage 1107 join each other.

A flap opening roller pair 124 constituting the flap opening mechanism 128 is disposed below a first branch position (in the —Z direction) that is a position where the envelope entry passage 1107 and the envelope conveyance passage 1105 join.

The flap opening roller pair 124 includes a pair of a drive roller and a driven roller. The envelope E is nipped between outer circumferential surfaces of the drive roller and the driven roller and is conveyed by rotation of the drive roller. A flap opening-and-scooping claw 40 is attached to a drive shaft to rotate coaxially with a rotation shaft of the drive roller.

A first vertical conveying roller pair includes the flap opening roller pair 124 disposed below the first branch position, and the first vertical conveying roller pair 122 and the second vertical conveying roller pair 123 disposed above the first branch position.

A separation roller pair 125 and an envelope conveying roller pair 126 are disposed in the envelope entry passage 1107 that joins the envelope conveyance passage 1105. A part of the stacked envelope E is taken out from the envelope set tray 127 by the separation roller pair 125. The envelope E is supplied to the envelope conveyance passage 1105 by the separation roller pair 125 and the envelope conveying roller pair 126 as an envelope supplier.

As illustrated in FIGS. 5 to 17, multiple envelopes E are stacked on the envelope set tray 127. The envelope E has a head portion and a bottom portion regardless of its outer shape and dimension. An opening portion is formed in the head portion, and a flap ef functioning as a lid for closing the opening portion is provided. The envelope E placed on the envelope set tray 127 is in a state where the bottom portion which is an opposite end of the flap ef faces the separation roller pair 125, and the flap ef is closed. Note that the state in which the flap ef is closed refers to a state where the flap ef is bent at a boundary position with the body of the envelope E so that the leading end of the flap ef approaches the body of the envelope E.

When the envelope E is ejected from the envelope set tray 127, the leading end of the envelope E in the conveyance direction corresponds to the bottom portion of the envelope E. The trailing end of the envelope E in the conveyance direction is the flap ef in a folded state.

Accordingly, in the present embodiment, when an envelope E is separated from envelopes E stacked in the envelope set tray 127 and conveyed through the envelope entry passage 1107 toward the flap opening roller pair 124, the downstream side of the envelope E in the conveyance direction is the bottom portion of the envelope E. The upstream side of the envelope E in the conveyance direction is the flap ef of the envelope E. In other words, the bottom portion of the envelope E conveyed in the envelope entry passage 1107 corresponds to the "leading end in the conveyance direction" in the envelope entry passage 1107. The flap ef corresponds to the "trailing end in the conveyance direction" in the envelope entry passage 1107.

The envelope E conveyed from the envelope set tray 127 by the separation roller pair 125 is conveyed by the envelope conveying roller pair 126 to a position beyond the envelope switchback switching claw 21. The envelope switchback switching claw 21 beyond which the envelope E has passed is rotated to a position where the conveyance direction is switched.

The envelope switchback switching claw 21 is held in either a position for temporarily conveying the envelope E from the envelope set tray 127 to the sealing conveyance passage 1106 or a position for conveying the envelope E toward the sheet conveying device 110 in the envelope conveyance passage 1105. That is, the envelope switchback switching claw 21 is a member that switches the conveyance direction of the envelope E.

The first vertical conveying roller pair 122 and the second vertical conveying roller pair 123 convey and hold the envelope E to a specified position in the envelope conveyance passage 1105. As described below, the specified position is a position where the position of the opening of the envelope E (the position of the flap ef) is lower than the enclosing roller pair 121 and higher than the first vertical conveying roller pair 122.

The enclosing roller pair 121 is a type of conveying roller that rotates in a direction in which the folded sheet Sf conveyed from the sheet conveying device 110 is enclosed in the envelope E.

As illustrated in FIG. 5, in the sealer 130, a third vertical conveying roller pair 131 and a fourth vertical conveying roller pair 132 as a switchback conveyor are disposed on the sealing conveyance passage 1106. The sealer 130 further includes an envelope ejection passage 1108 that branches from the sealing conveyance passage 1106 at a second branching position. An envelope ejection switching claw 31 is disposed at the second branching position. An envelope ejection roller pair 133, which is part of a first ejector, is disposed in the envelope ejection passage 1108. The envelope ejection roller pair 133 is disposed at an end portion of the envelope ejection passage 1108.

A second vertical conveying roller pair includes the third vertical conveying roller pair 131 and the fourth vertical conveying roller pair 132. The third vertical conveying roller pair 131 and the fourth vertical conveying roller pair 132 convey and hold the envelope Eat a specified position of the sealing conveyance passage 1106.

The envelope ejection switching claw 31 rotates between a position at which the envelope E is conveyed from the flap opening roller pair 124 to the third vertical conveying roller pair 131 in the enclosure conveyance passage 1104 and a position at which the envelope E is conveyed from the enclosure conveyance passage 1104 to the envelope ejection passage 1108. The envelope ejection switching claw 31 is a member that switches the conveyance direction of the envelope E.

A sealing mechanism 135 as a sealer that performs "sealing processing" of closing the flap ef is disposed in the sealing conveyance passage 1106. If the flap ef of the envelope E conveyed by the third vertical conveying roller pair 131 and the fourth vertical conveying roller pair 132 is open, the sealing mechanism 135 performs a processing of closing the flap ef.

The envelope ejection roller pair 133 is a roller pair that ejects the envelope E toward the envelope ejection tray 134.

The envelope ejection tray 134 serving as an envelope stacker is a tray on which the ejected envelope E is placed.

As described above, the conveyance passages that convey the folded sheet Sf from the sheet conveying device 110 to the enclosing device 120 and the sealer 130 are disposed to be connected in the vertical direction (Z direction) in the envelope processing apparatus 100. This connected conveyance passage, which serves as both a conveyance passage for the folded sheet Sf and a conveyance passage for the envelope E, corresponds to a vertical conveyance passage in which the envelope conveyance passage 1105 of the enclosing device 120 and the sealing conveyance passage 1106 of the sealer 130 are connected in the vertical direction (Z direction).

Next, an example of a series of processes of the enclosing operation and the sealing operation in the envelope processing apparatus 100 is described with reference to FIGS. 6 to 17. In FIGS. 6 to 17, reference signs are mainly assigned to elements used in the description of each of operation steps. For the sake of explanation, the steps of the processing are distinguished from each other in the drawings. However, the processes may proceed in parallel.

Figure 6:
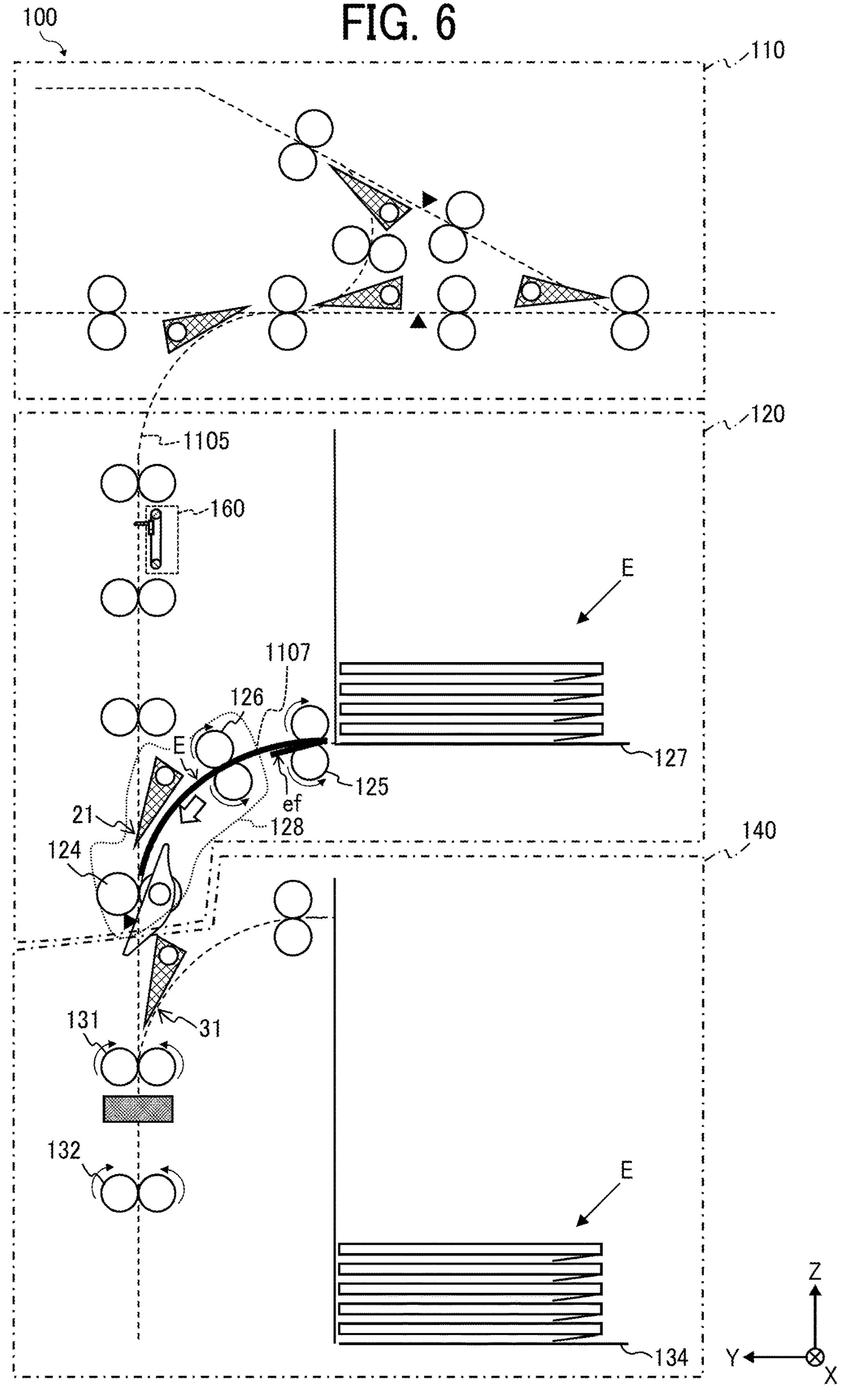
FIG. 6 is a diagram illustrating a step of an enclosing operation of the envelope processing apparatus according to an embodiment of the present disclosure.

First, as illustrated in FIG. 6, the envelope E are separated one by one by the separation roller pair 125 from the envelope set tray 127 on which a plurality of envelope E are stacked, and are conveyed to the flap opening roller pair 124 by the envelope conveying roller pair 126. At this time, the envelope switchback switching claw 21 and the envelope ejection switching claw 31 are oriented in the directions illustrated in FIG. 5. The flap opening roller pair 124, the third vertical conveying roller pair 131, and the fourth vertical conveying roller pair 132 rotate in a direction in which the envelope E is conveyed downward and convey the envelope E to a specified position in the enclosure conveyance passage 1104.

Figure 7:
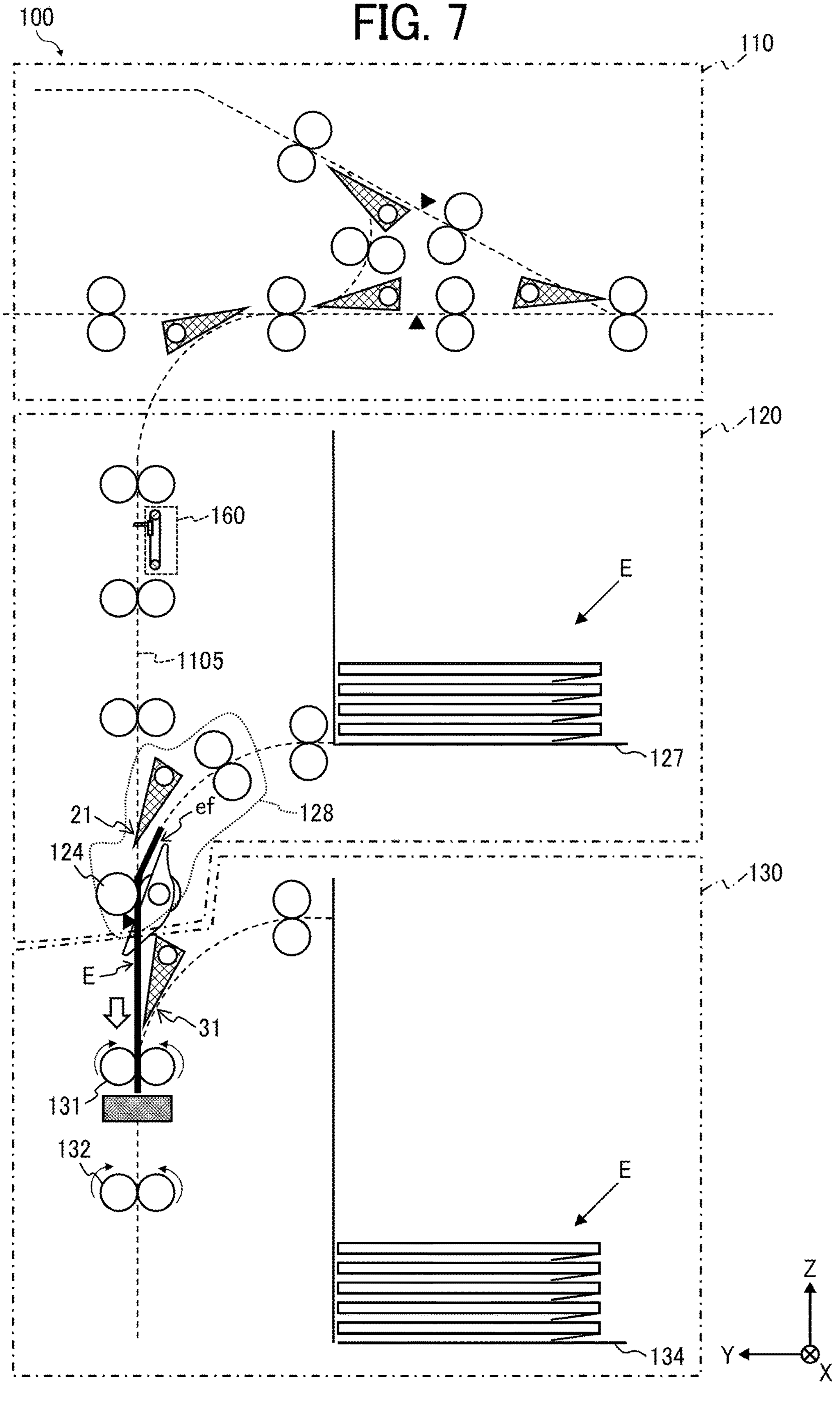
FIG. 7 is a diagram illustrating a step of the enclosing operation of the envelope processing apparatus, subsequent to the state in FIG. 6.

Subsequently, as illustrated in FIG. 7, when the envelope E completely passes through the flap opening roller pair 124, the flap ef is being opened by the flap opening mechanism 128. As a result, the envelope E with the flap ef open reaches the subsequent state illustrated in FIG. 8 by the rotations of the flap opening roller pair 124, the third vertical conveying roller pair 131, and the fourth vertical conveying roller pair 132.

Figure 8:
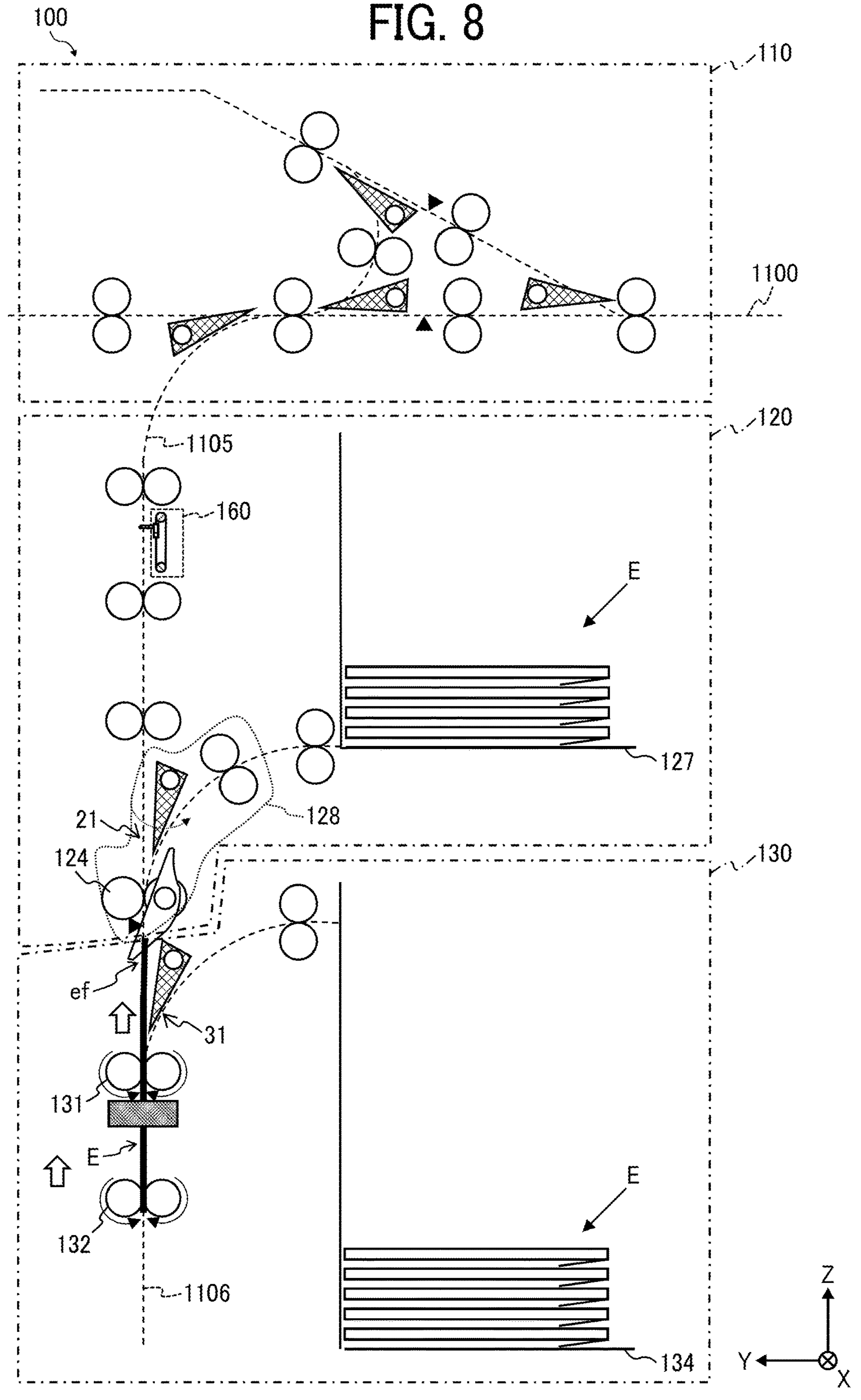
FIG. 8 is a diagram illustrating an operation of a flap opening mechanism in the enclosing operation of the envelope processing apparatus, subsequent to the state in FIG. 7.

Subsequently, as illustrated in FIG. 8, after the flap ef of the envelope E is being opened and reaches a position where the flap ef has passed through the flap opening roller pair 124, the third vertical conveying roller pair 131 and the fourth vertical conveying roller pair 132 are rotated in reverse. By this operation, switchback conveyance of the envelope E is performed toward a specified position of the enclosing device 120. The envelope switchback switching claw 21 rotates in a direction illustrated by a dashed arrow in FIG. 8 before switchback conveyance of the envelope E starts or simultaneously with switchback conveyance. As a result, the envelope E turns into the state where the envelope E can be conveyed upward in the envelope conveyance passage 1105. An envelope switchback roller includes the flap opening roller pair 124, the third vertical conveying roller pair 131, and the fourth vertical conveying roller pair 132.

Figure 9:
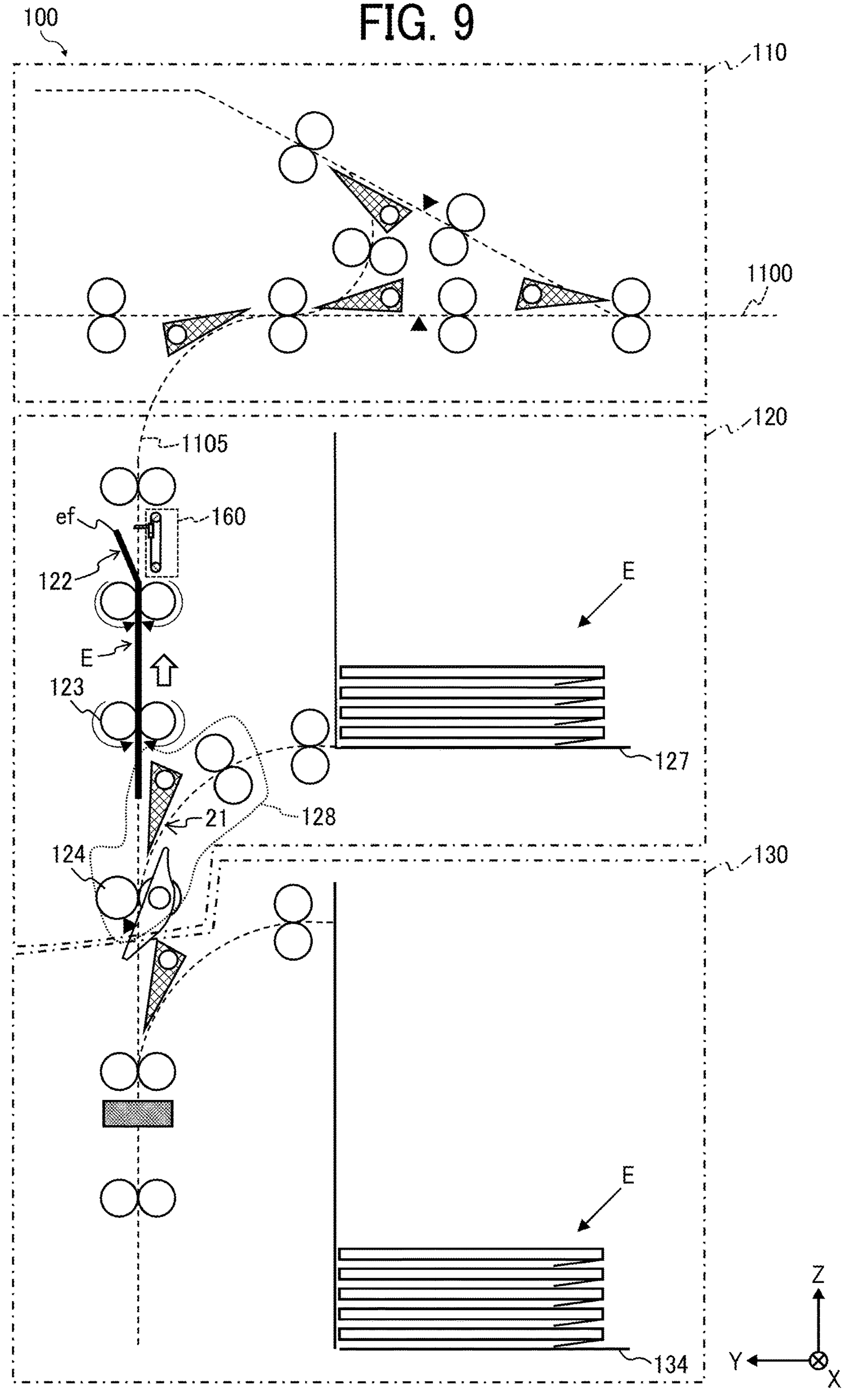
FIG. 9 is a diagram illustrating a step of the enclosing operation of the envelope processing apparatus, subsequent to the state in FIG. 8.

As illustrated in FIG. 9, the second vertical conveying roller pair 123 and the first vertical conveying roller pair 122 included in the switchback conveyor convey the envelope E to the enclosing position. When the flap ef has reached a position where the flap ef passes through the first vertical conveying roller pair 122, the rotations of the second vertical conveying roller pair 123 and the first vertical conveying roller pair 122 are stopped, and the enclosing standby operation is started.

In the control that conveys the envelope E to the enclosing position, the processing that calculates the conveyance amount of the envelope E from the rotation amount of each conveying roller is executed after the separation roller pair 125 takes out the envelope E. In addition, the position of the envelope E in the enclosure conveyance passage 1104 can be determined based on the calculated length of the envelope E and the length of the flap ef, the conveyance amount of the envelope E, and the length of the conveyance passage passing through the envelope entry passage 1107 and the envelope conveyance passage 1105.

Figure 10:
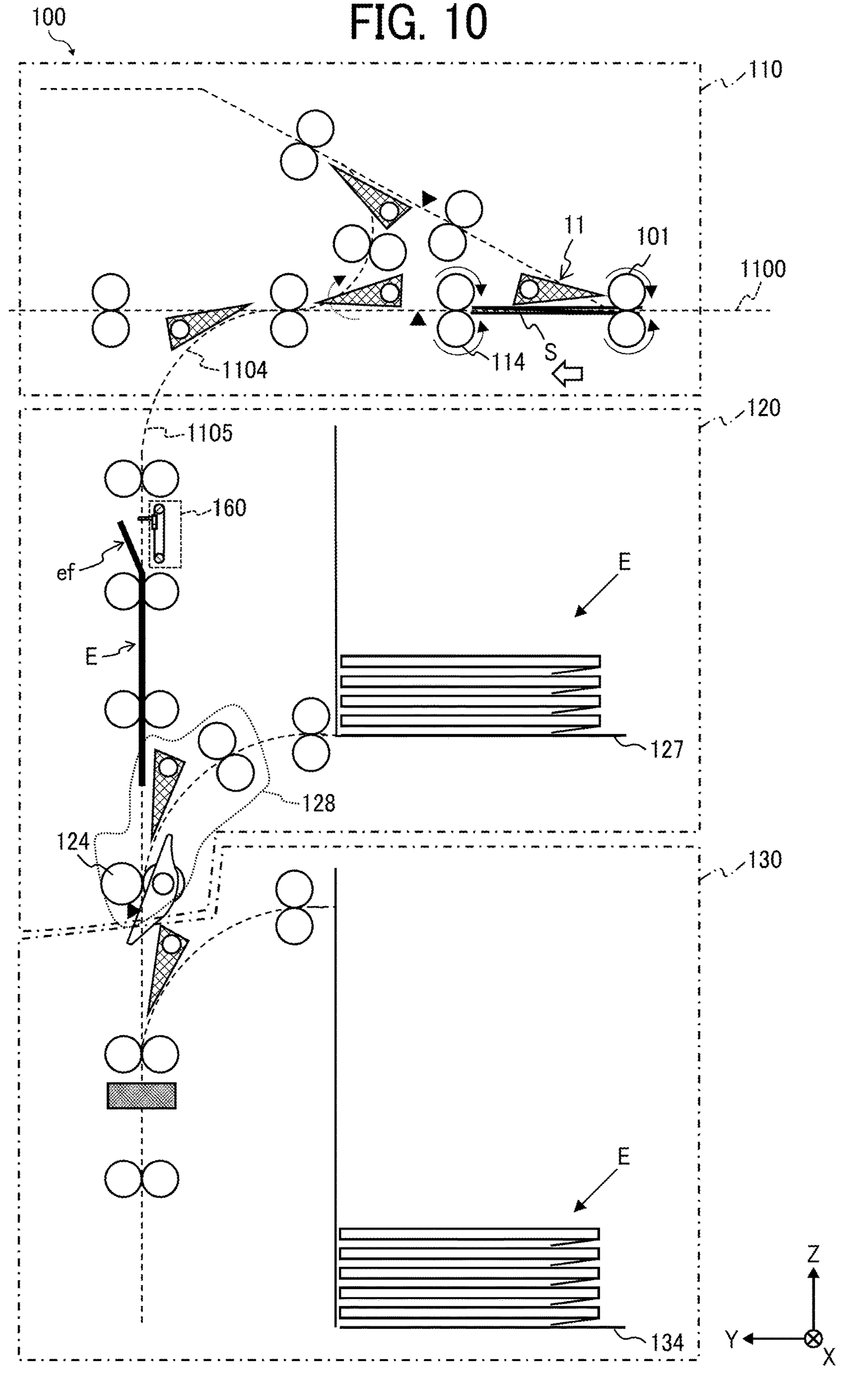
FIG. 10 is a diagram illustrating a step of the enclosing operation of the envelope processing apparatus, subsequent to the state in FIG. 9.

Subsequently, as illustrated in FIG. 10, the envelope processing apparatus 100 receives the folded sheet Sf from the upstream apparatus (folding apparatus 300) by the entrance roller pair 101 and conveys the folded sheet Sf to the first conveyance passage 1101 in a state where the envelope E is held at the enclosing position.

Figure 11:
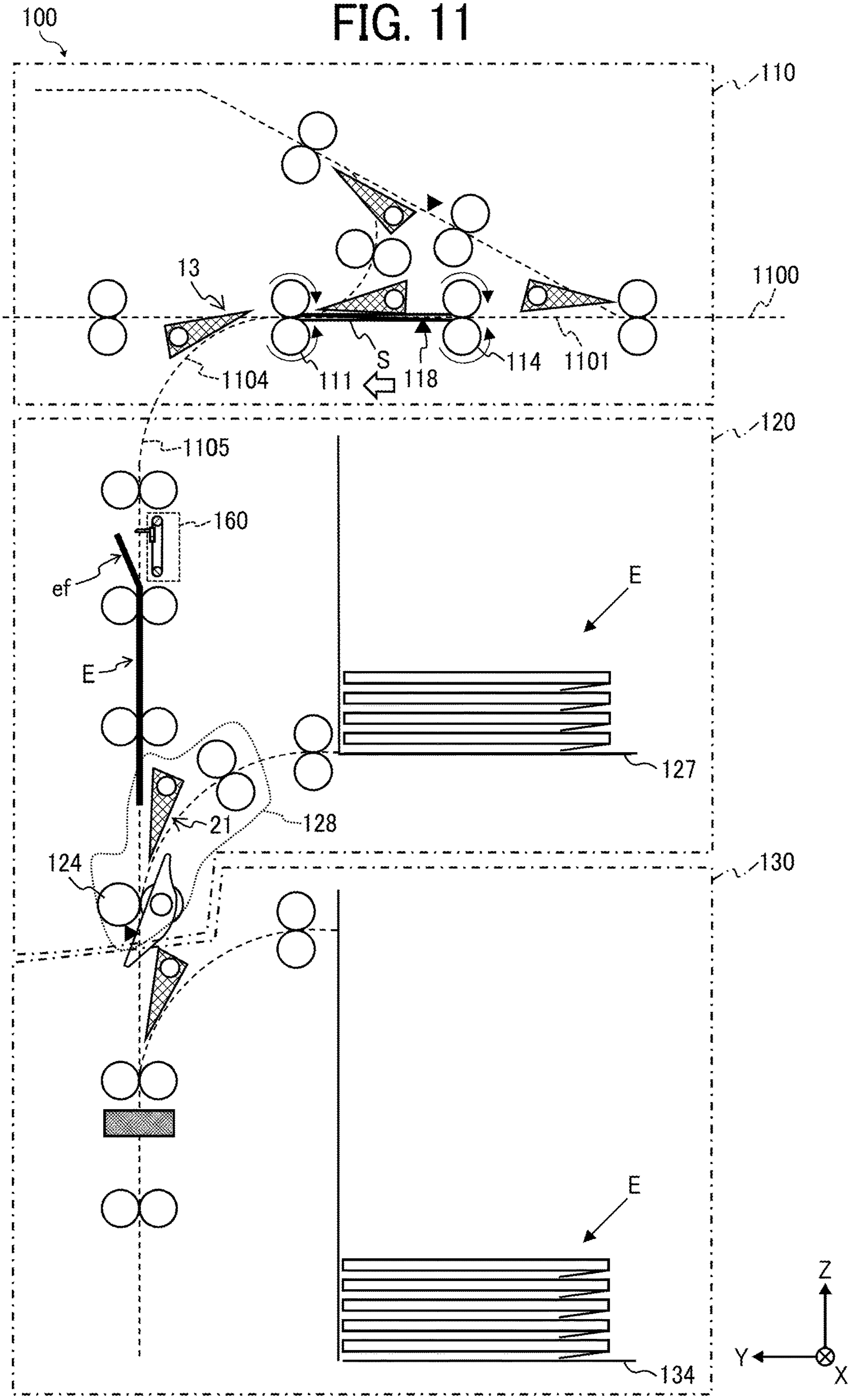
FIG. 11 is a diagram illustrating a step of the enclosing operation of the envelope processing apparatus, subsequent to the state in FIG. 10.

Subsequently, as illustrated in FIG. 11, the first intermediate conveying roller pair 114 and the first conveying roller pair 111 convey the folded sheet Sf downstream in the sheet conveyance direction. At this time, the first switching claw 11 and the third switching claw 13 are positioned as illustrated in FIG. 9. The folded sheet Sf is conveyed from the first conveyance passage 1101 to the enclosure conveyance passage 1104.

Figure 12:
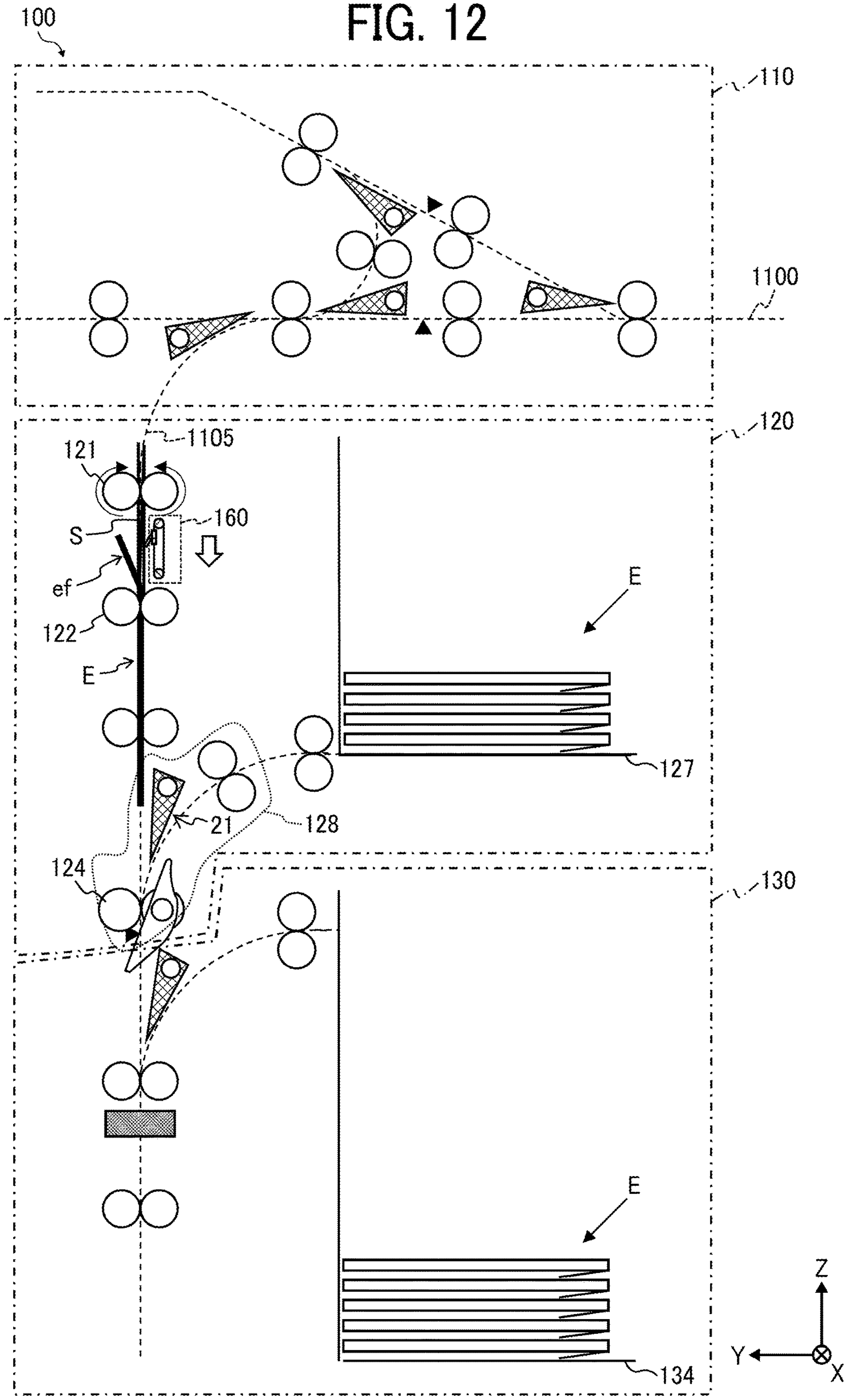
FIG. 12 is a diagram illustrating a step of the enclosing operation of the envelope processing apparatus, subsequent to the state in FIG. 11.

Thereafter, as illustrated in FIG. 12, the enclosing roller pair 121 conveys the folded sheet Sf conveyed from the enclosure conveyance passage 1104 to the envelope conveyance passage 1105 further downward. As a result, the first vertical conveying roller pair 122 and the like hold the folded sheet Sf at a specified enclosing position in the envelope conveyance passage 1105. The folded sheet Sf is enclosed into the opening of the envelope E in the enclosing standby state. In this enclosing operation, the folded sheet Sf is pushed into the envelope E by the enclosure pusher 160 as a pushing mechanism constituting an enclosure pusher. The enclosure pusher 160 has at least two different operation modes. For example, the operation modes include at least a first mode in which an enclosing operation is performed so that a part of the enclosure protrudes outward from the body of the envelope E and a second mode in which an enclosing operation is performed so that the enclosure does not protrude outward from the body of the envelope E. Details of the operation of the enclosure pusher 160 are described below.

Figure 13:
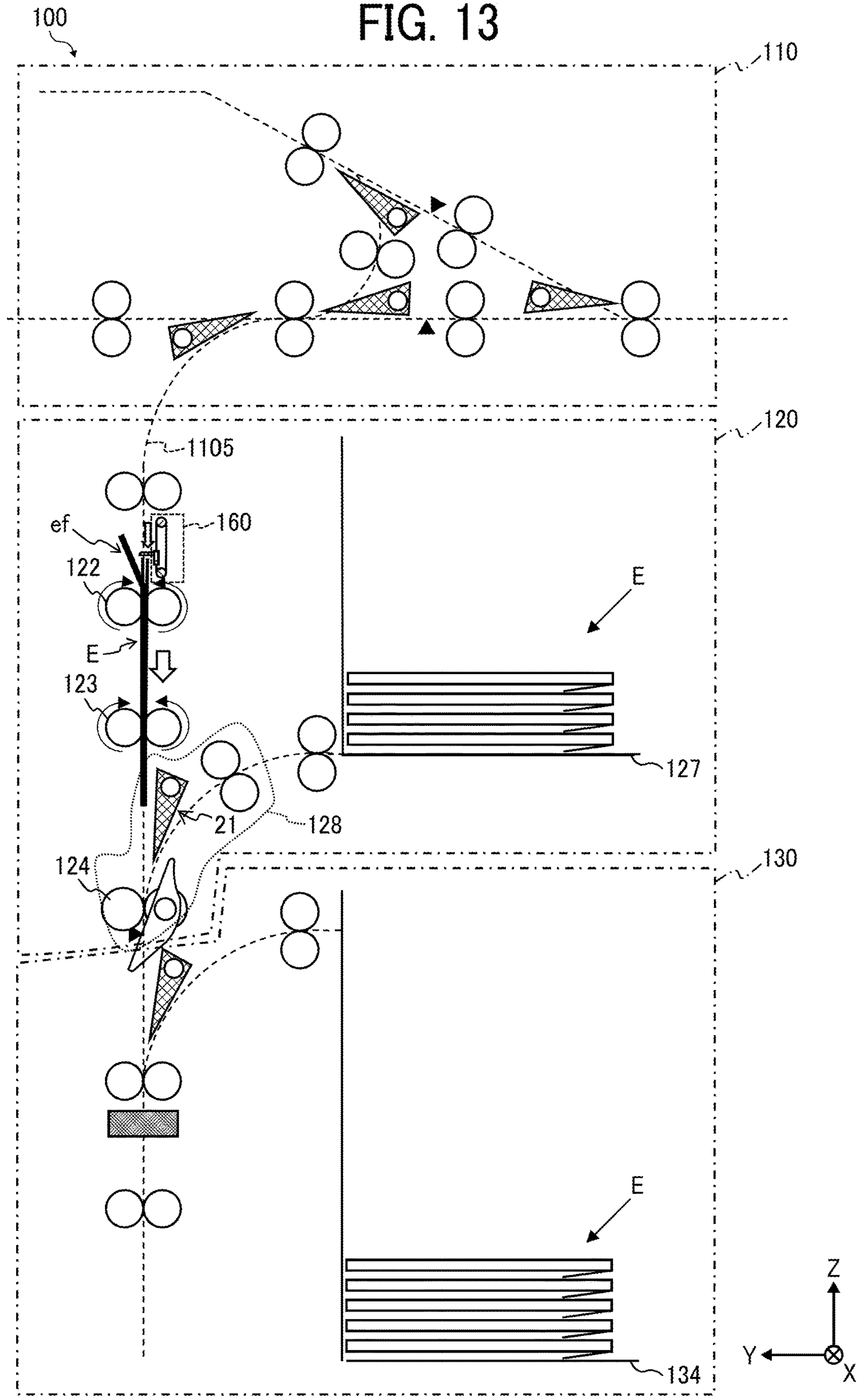
FIG. 13 is a diagram illustrating a step of the enclosing operation of the envelope processing apparatus, subsequent to the state in FIG. 12.
Figure 14:
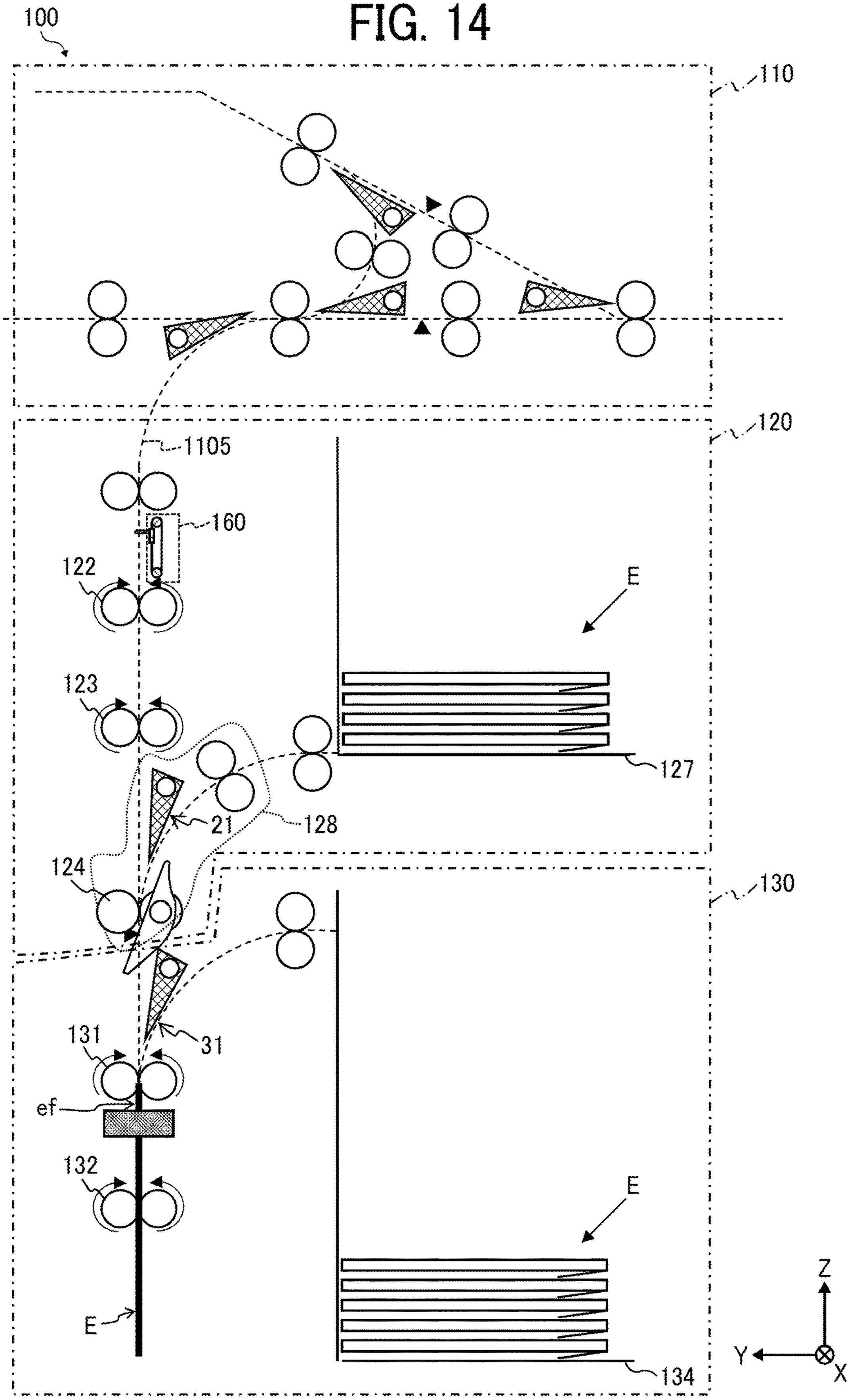
FIG. 14 is a diagram illustrating a step of the enclosing operation of the envelope processing apparatus, subsequent to the state in FIG. 13.

Subsequently, as illustrated in FIG. 13, the first vertical conveying roller pair 122 and the second vertical conveying roller pair 123 are rotated to convey the envelope E downward along the envelope conveyance passage 1105. As illustrated in FIG. 14, the envelope E is conveyed to the fourth vertical conveying roller pair 132, and the flap ef reaches a position where the flap ef passes through the envelope ejection switching claw 31.

Figure 15:
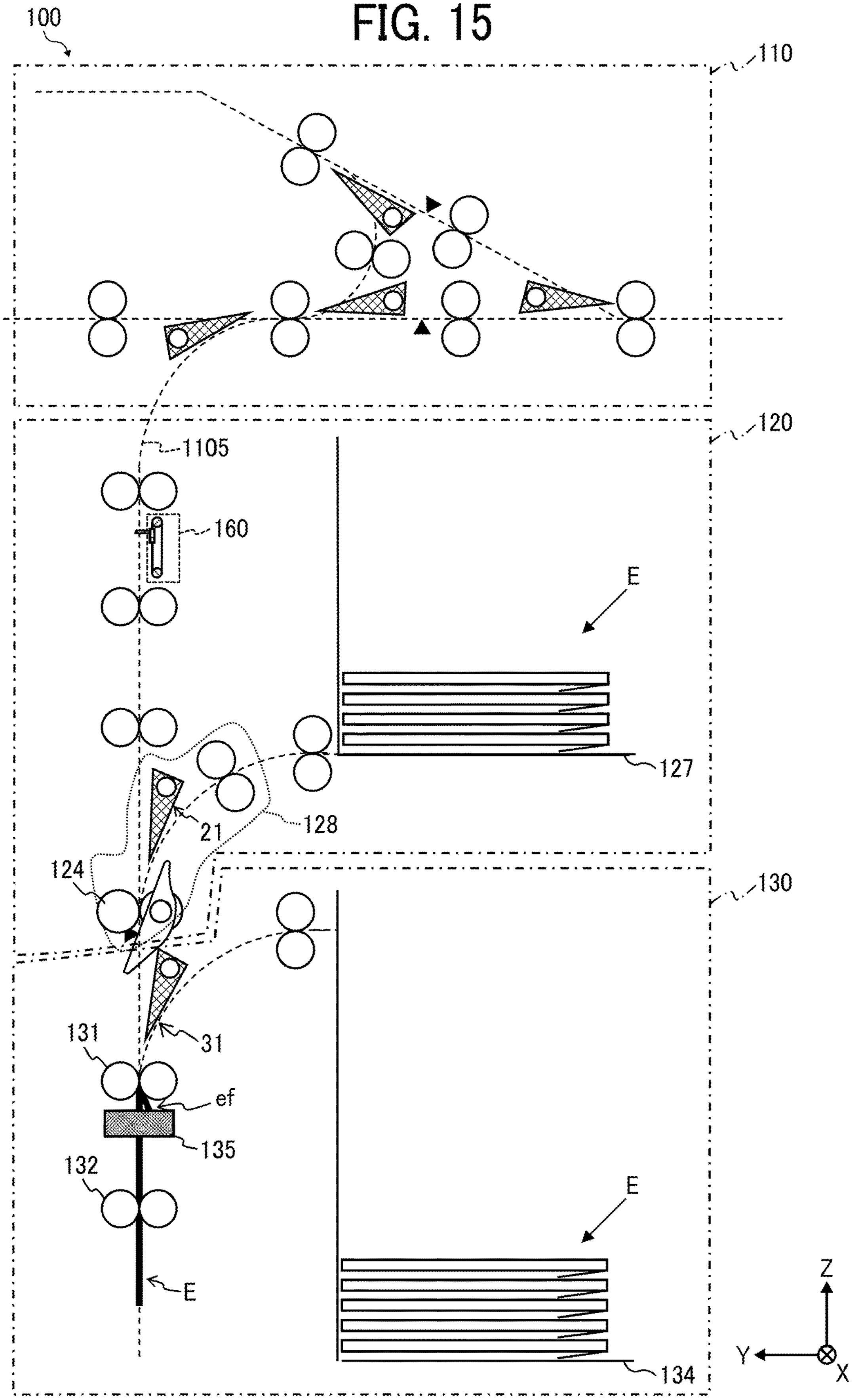
FIG. 15 is a diagram illustrating a step of the enclosing operation of the envelope processing apparatus, subsequent to the state in FIG. 14.

After the flap ef has reached the position where the flap ef passes through the envelope ejection switching claw 31, as illustrated in FIG. 15, the flap ef is closed by the sealing mechanism 135 between the third vertical conveying roller pair 131 and the fourth vertical conveying roller pair 132 to seal the envelope E.

Figure 16:
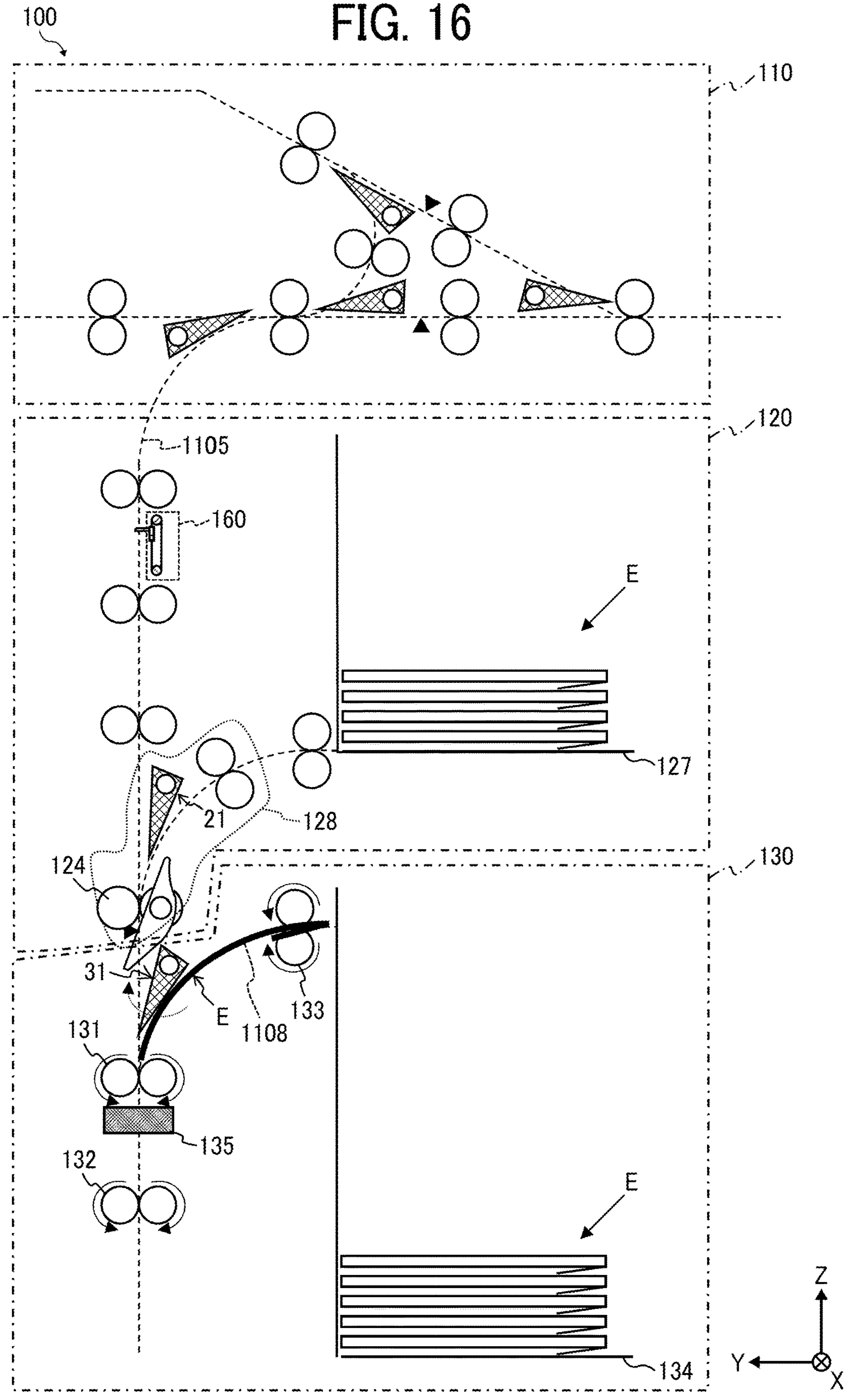
FIG. 16 is a diagram illustrating a step of the enclosing operation of the envelope processing apparatus, subsequent to the state in FIG. 15.

Thereafter, as illustrated in FIG. 16, the third vertical conveying roller pair 131 and the fourth vertical conveying roller pair 132 rotate in reverse to convey the sealed envelope E with switchback manner. Before the third vertical conveying roller pair 131 and the fourth vertical conveying roller pair 132 rotate in reverse, the envelope ejecting switching claw 31 rotates to be a state illustrated in FIG. 16. Accordingly, the sealed envelope E is conveyed from the envelope conveyance passage 1105 to the envelope ejection passage 1108.

Figure 17:
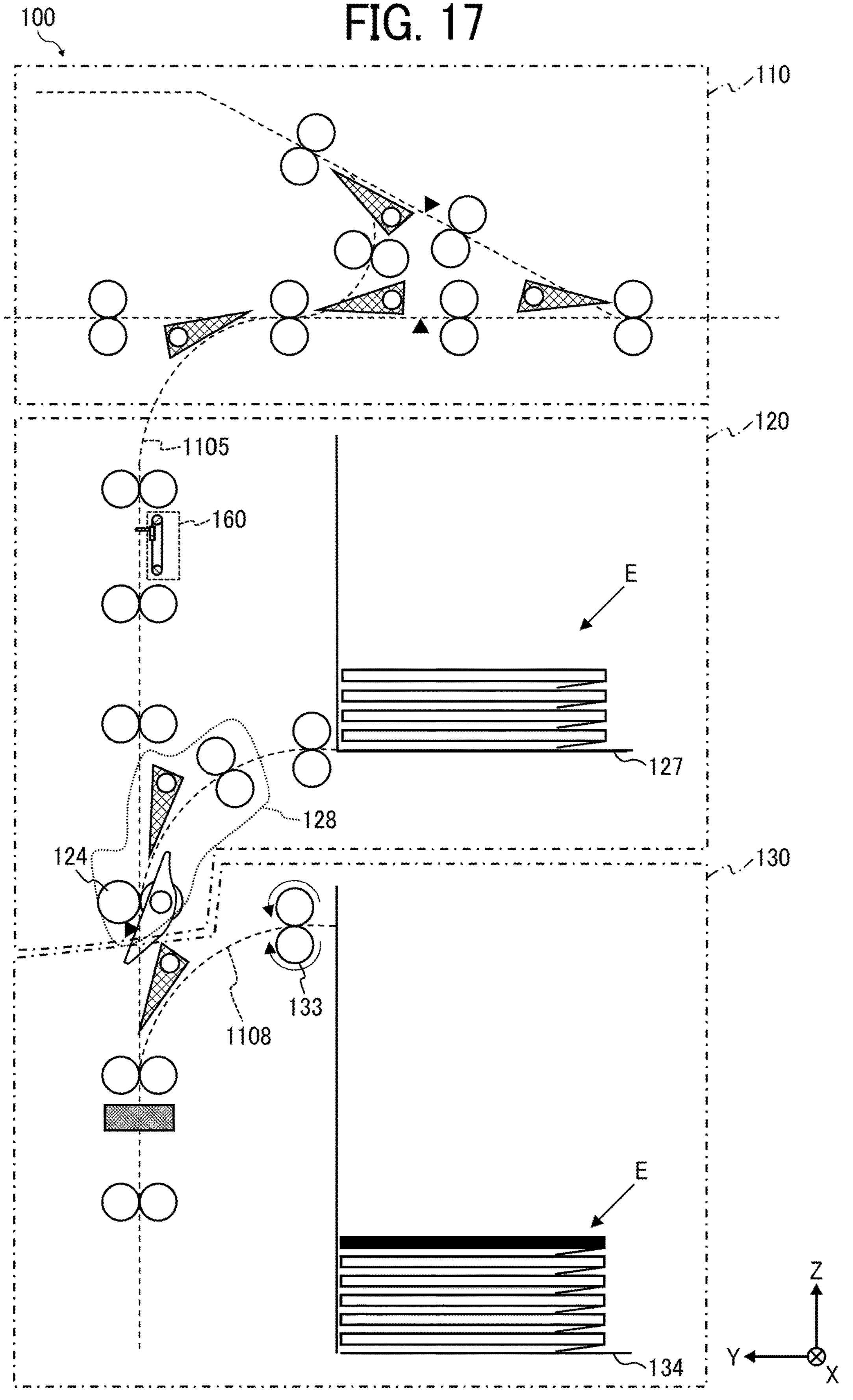
FIG. 17 is a diagram illustrating a step of the enclosing operation of the envelope processing apparatus, subsequent to the state in FIG. 16.

As a result, as illustrated in FIG. 17, the envelope ejection roller pair 133 ejects the sealed envelope E onto the envelope ejection tray 134.

Figure 18A:
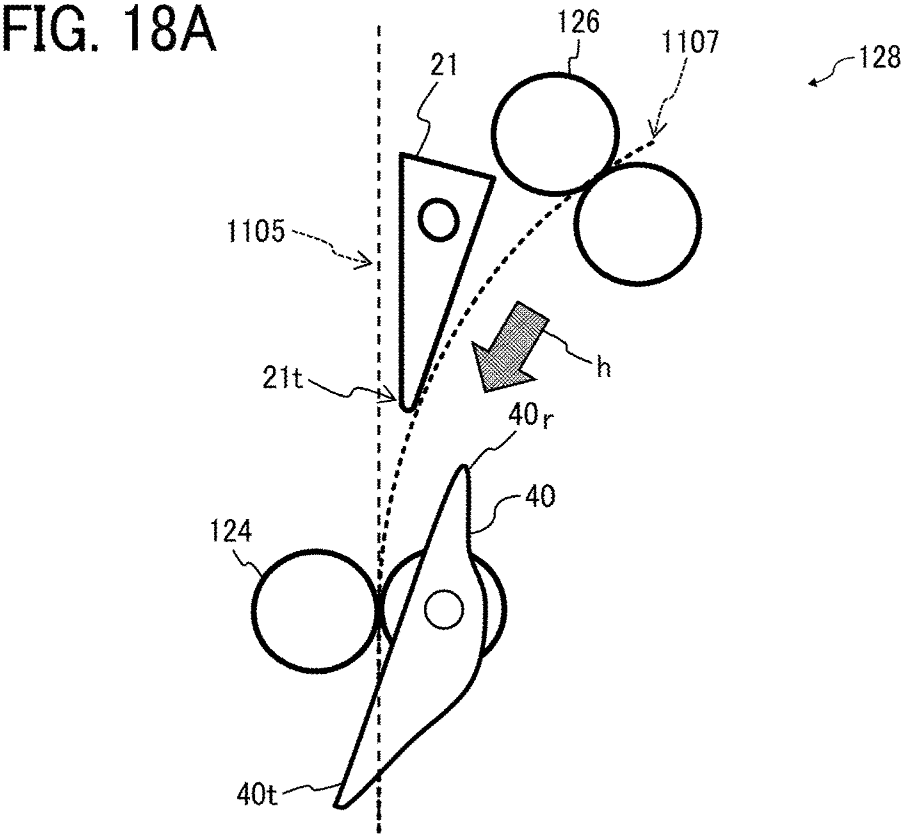
FIGS. 18A and 18B are diagrams illustrating a configuration of the flap opening mechanism included in the envelope processing apparatus, according to an embodiment of the present disclosure.
Figure 18B:
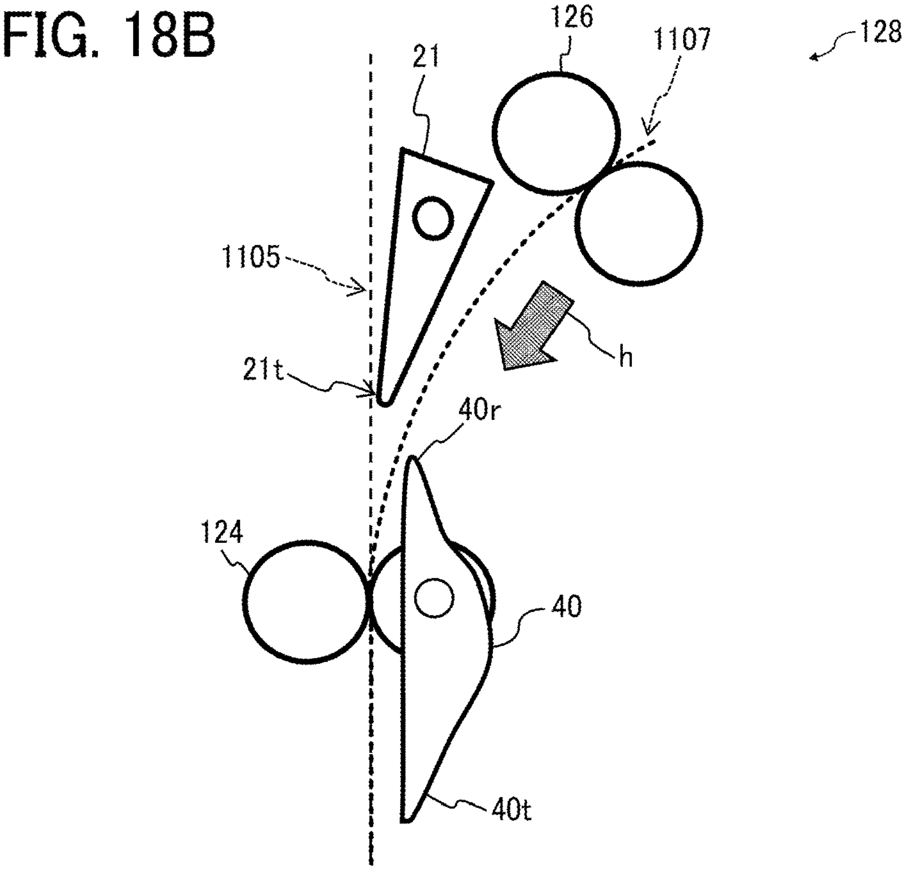

Next, a description is given of the flap opening mechanism 128 including the flap opening-and-scooping claw 40 as a flap opener below. A direction indicated by a black thick arrow h illustrated in FIGS. 18A and 18B is a conveyance direction of the envelope E in the flap opening mechanism 128. In the flap opening mechanism 128, the envelope conveying roller pair 126, the envelope switchback switching claw 21, and the flap opening roller pair 124 are disposed when viewed from the upstream side in the conveyance direction in the envelope entry passage 1107.

The flap opening-and-scooping claw 40 is rotatably attached to the rotation shaft of one of the roller pairs included in the flap opening roller pair 124.

FIG. 18A is a schematic view of the flap opening mechanism 128 according to a first state. The flap opening mechanism 128 illustrated in FIG. 18A is held such that a flap opening leading end 40*t* as one end corresponding to the leading end side of the flap opening-and-scooping claw 40 in the conveyance direction is positioned to straddle the envelope conveyance passage 1105 as a conveyance passage.

In the flap opening mechanism 128 illustrated in FIG. 18A, a switching leading end 21*t* which is the leading end of the envelope switchback switching claw 21 is held at a position close to the envelope entry passage 1107.

FIG. 18B is a schematic view of the flap opening mechanism 128 according to a second state. In the flap opening mechanism 128 illustrated in FIG. 18B, a flap opening trailing end 40*r* as the other end corresponding to the trailing end side in the conveyance direction of the flap opening-and-scooping claw 40 is held at a position close to the envelope entry passage 1107 as a conveyance passage. The flap opening leading end 40*t* is held at a position away from the envelope conveyance passage 1105, rather than at a position straddling the envelope conveyance passage 1105 as a conveyance passage.

In the flap opening mechanism 128 illustrated in FIG. 18B, the switching leading end 21*t* of the envelope switchback switching claw 21 is held at a position along the tangent direction of the arc-shaped envelope entry passage 1107.

Figure 19A:
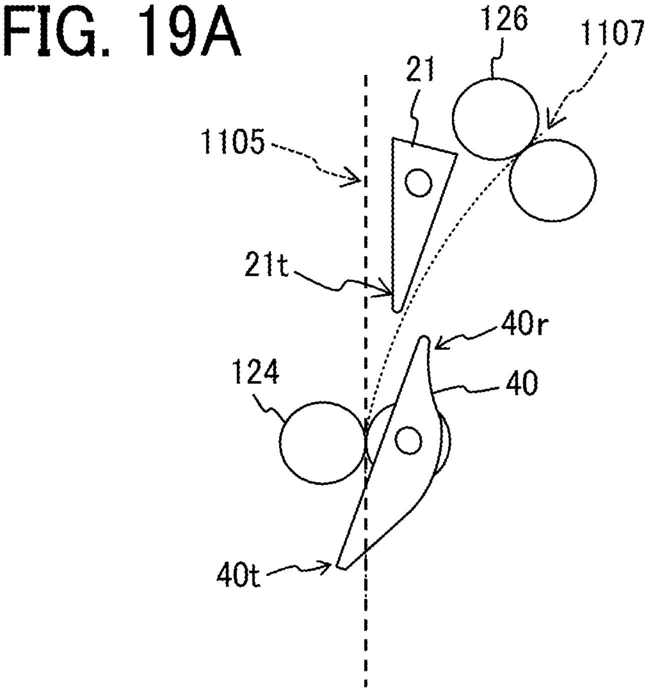
FIGS. 19A to 19F are diagrams illustrating an example of a flap opening operation of the flap opening mechanism.

Next, a description is given of a process of an operation of the flap opening mechanism 128 according to a first embodiment with reference to FIGS. 19A to 19F. The state illustrated in FIG. 19A is substantially the same as the state illustrated in FIG. 18A described above, and is an initial state before the envelope E is conveyed.

Figure 19B:
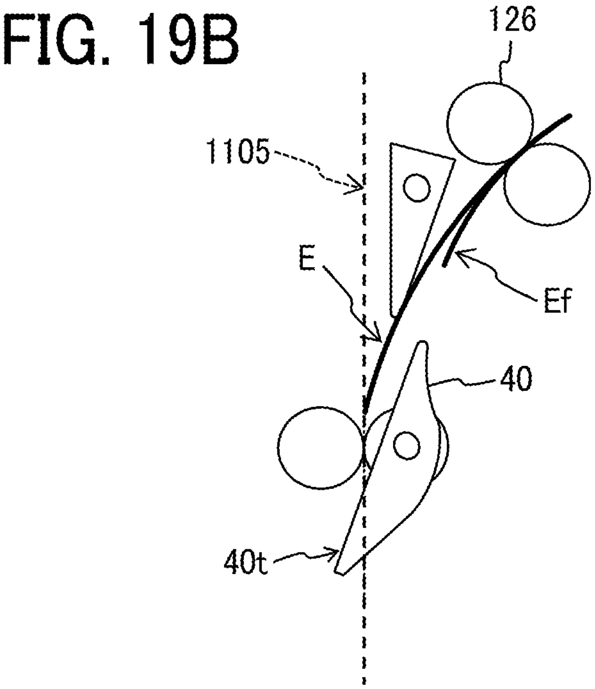

Subsequently, as illustrated in FIG. 19B, the envelope E is conveyed from the upstream side to the downstream side in the conveyance direction in the envelope entry passage 1107. When the bottom portion (leading end in the conveyance direction) of the envelope E passes through the switching leading end 21*t* and is further conveyed, the envelope E turns into the state illustrated in FIG. 19C.

Figure 19C:
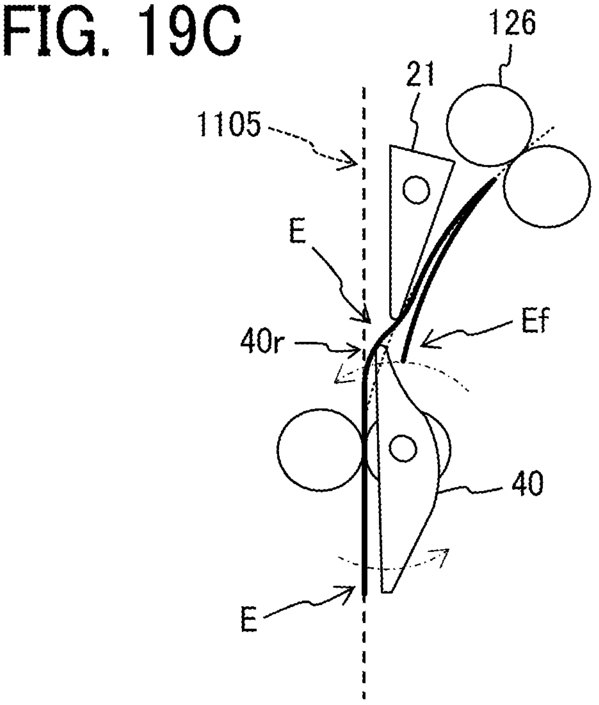

As illustrated in FIG. 19C, when the flap opening roller pair 124 nips the envelope E and further conveys the envelope E in the conveyance direction, the flap ef of the envelope E moves along the outer side of the flap opening trailing end 40*r* in the conveyance direction. This is because the envelope entry passage 1107 is formed in an arc shape, and the switching leading end 21*t* is located at a position close to the envelope entry passage 1107. Thus, the leading end of the envelope E in the conveyance direction is urged toward the flap opening roller pair 124 without jumping out from the envelope entry passage 1107.

When the leading end of the envelope E in the conveyance direction comes into contact with the flap opening-and-scooping claw 40 and the envelope E is further conveyed, the flap opening-and-scooping claw 40 is rotated as illustrated in FIG. 19C. By this rotation, the flap opening trailing end 40*r* of the flap opening-and-scooping claw 40 moves in a direction approaching the envelope entry passage 1107. Thus, the flap opening trailing end 40*r* reaches a position where the flap opening trailing end 40*r* overlaps the switching leading end 21*t* in the envelope entry passage 1107. Accordingly, the middle portion of the envelope E is pushed out in the direction along the Z direction from the arc-shaped route of the envelope entry passage 1107. As a result, the flap ef is away from the body of the envelope E, and the flap ef is triggered to open.

Figure 19D:
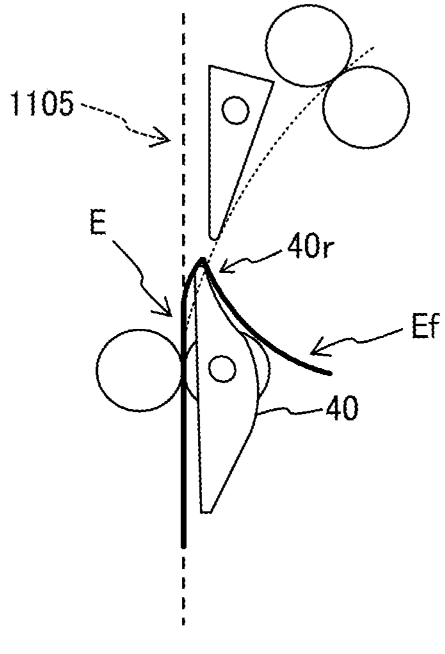
Figure 19E:
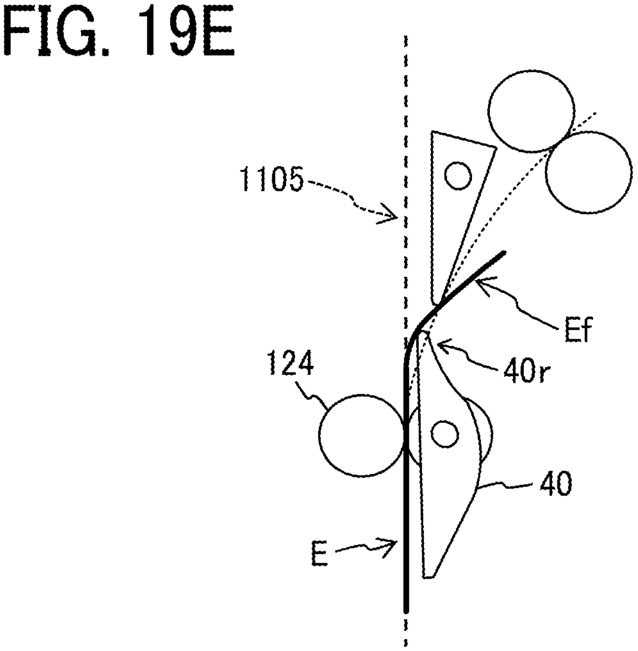

Subsequently, when the envelope E is conveyed, as illustrated in FIG. 19D, the boundary portion between the body of the envelope E and the flap ef comes into contact with the flap opening trailing end 40*r*. When the envelope E is further conveyed, as illustrated in FIG. 19E, the flap ef moves to trace the flap opening trailing end 40*r* in accordance with the conveyance of the envelope E.

Figure 19F:
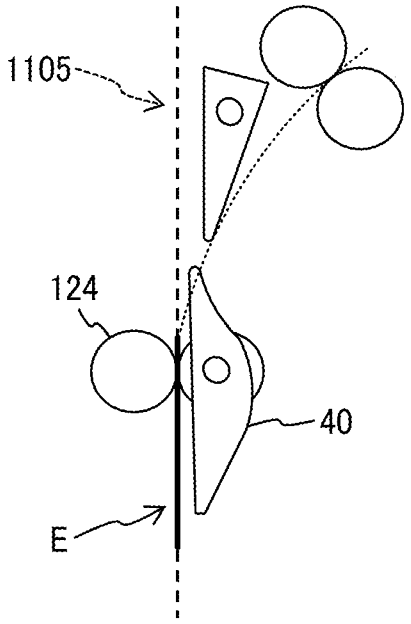

As illustrated in FIG. 19F, the envelope E with the flap ef opened is conveyed in the envelope conveyance passage 1105. Thus, the flap ef turns into being opened.

Figure 20A:
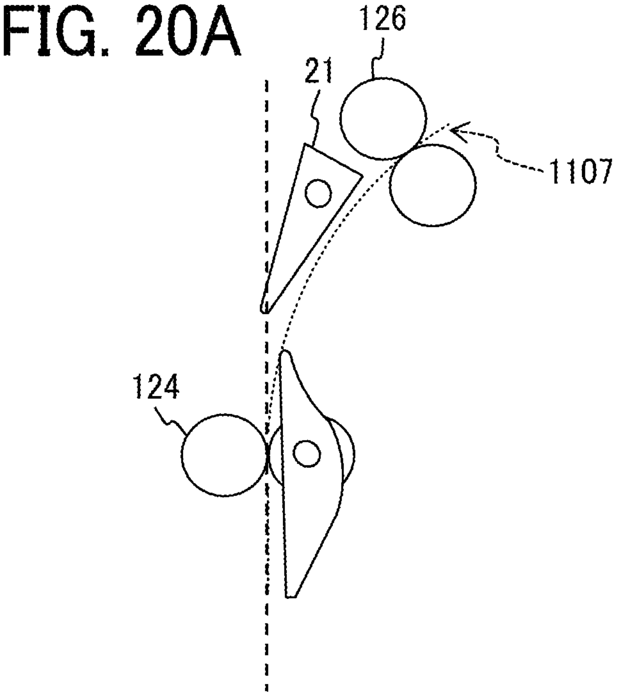
FIGS. 20A to 20F are diagrams illustrating another example of the flap opening operation of the flap opening mechanism.

Next, a description is given of a process of the operation of the flap opening mechanism 128 according to a second embodiment with reference to FIGS. 20A to 20F. The state illustrated in FIG. 20A is substantially the same state as the state illustrated in FIG. 18B described above, and is an initial state before the envelope E is conveyed.

Figure 20B:
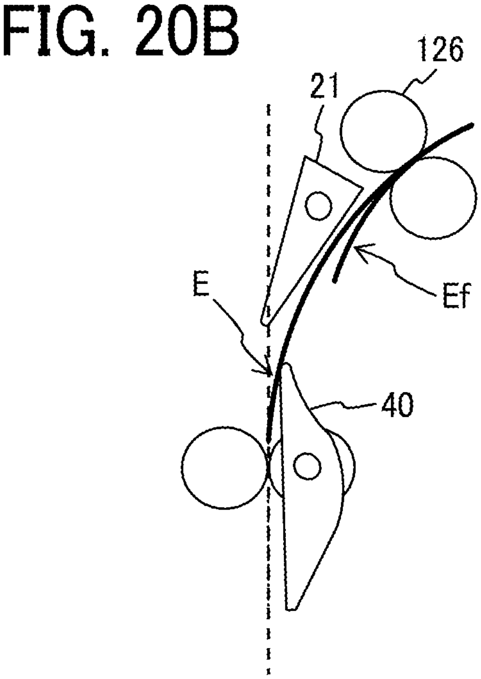

Subsequently, as illustrated in FIG. 20B, the envelope E is conveyed from the upstream side to the downstream side in the conveyance direction in the envelope entry passage 1107. When the bottom portion (leading end in the conveyance direction) of the envelope E passes through the switching leading end 21*t* and is further conveyed, the envelope E turns into the state illustrated in FIG. 20C.

Figure 20C:
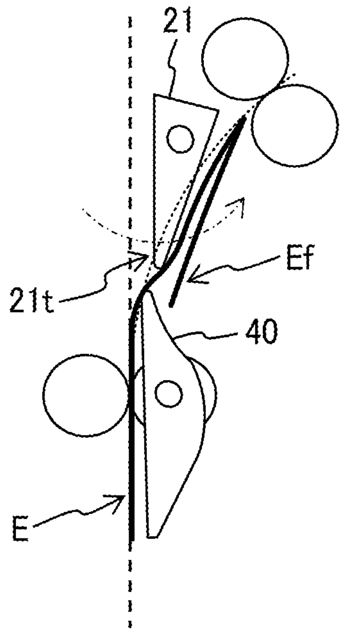

As illustrated in FIG. 20C, when the bottom portion of the envelope E passes through the flap opening trailing end 40*r* and reaches a certain position, the switching leading end 21*t* rotates to a position where the switching leading end 21*t* straddles the envelope entry passage 1107. As a result, the flap ef of the envelope E moves along the outer side of the flap opening trailing end 40*r* in the conveyance direction. This is because the body of the envelope E is moved to the inside of the envelope entry passage 1107 by the envelope entry passage 1107 being formed in an arc shape and the switching leading end 21*t* straddling the envelope entry passage 1107.

As a result, the flap ef is away from the body of the envelope E, and the flap ef is triggered to open.

Figure 20D:
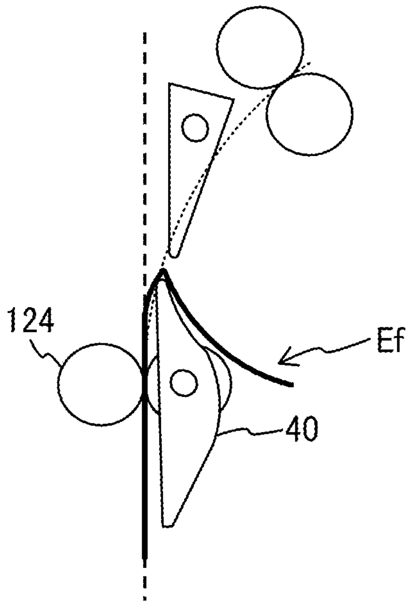
Figure 20E:
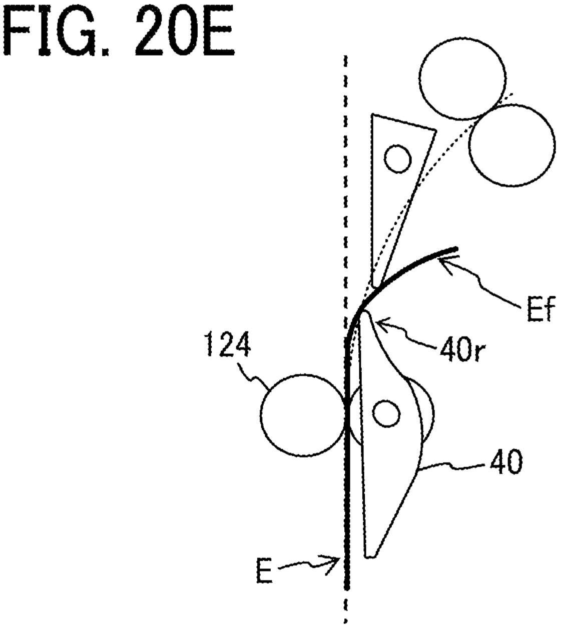

Subsequently, when the envelope E is conveyed, as illustrated in FIG. 20D, the boundary portion between the body of the envelope E and the flap ef comes into contact with the flap opening trailing end 40*r*. When the envelope E is further conveyed, as illustrated in FIG. 20E, the flap ef moves to trace the flap opening trailing end 40*r* in accordance with the conveyance of the envelope E.

Figure 20F:
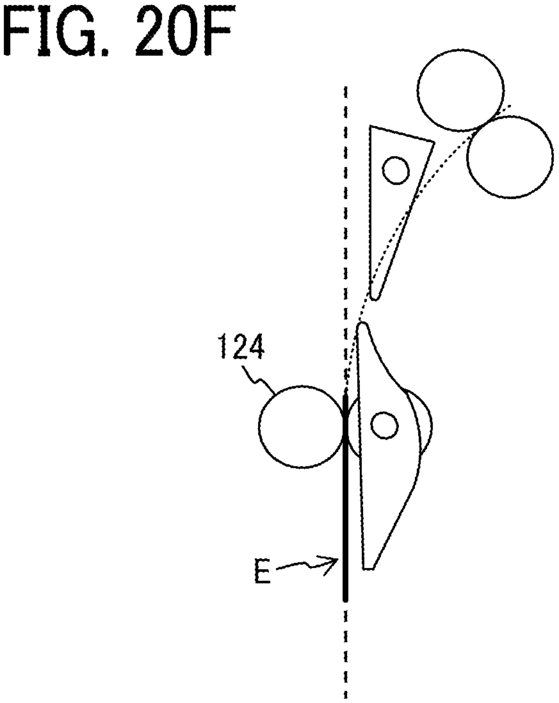

Then, as illustrated in FIG. 20F, the envelope E with the flap ef opened is conveyed on the envelope conveyance passage 1105, and the flap ef is opened.

Figure 21:
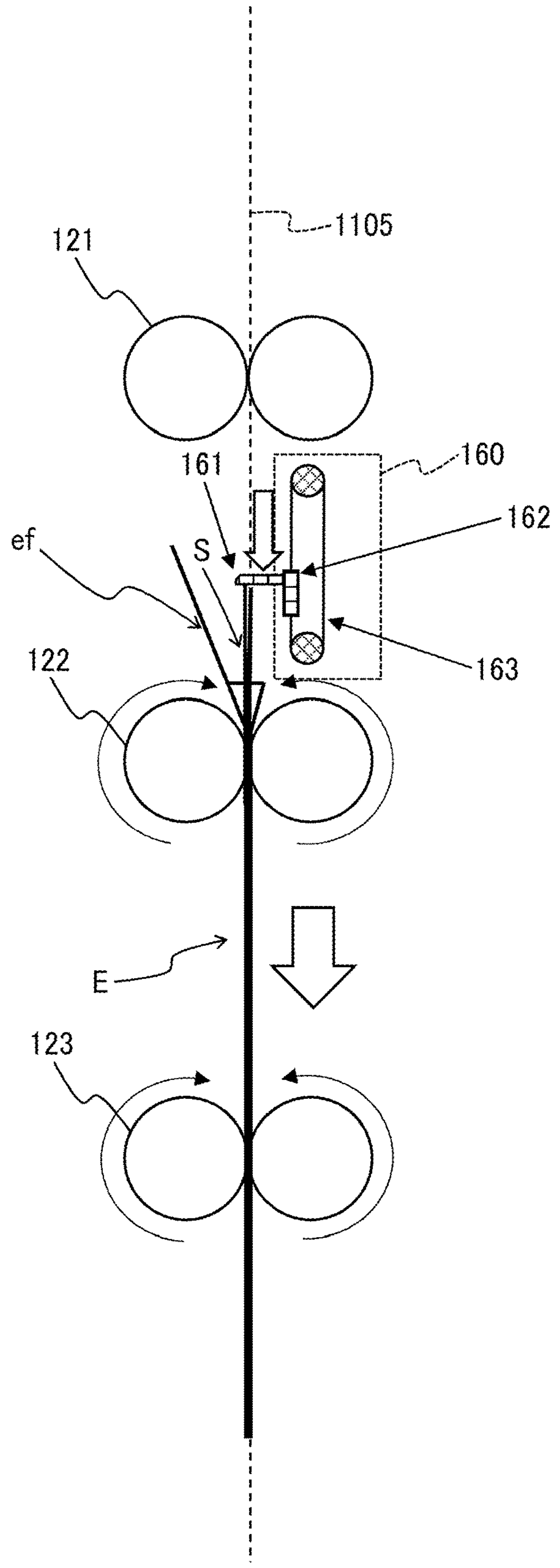
FIG. 21 is a diagram illustrating a configuration of the enclosure pusher included in the envelope processing apparatus.
Figure 22:
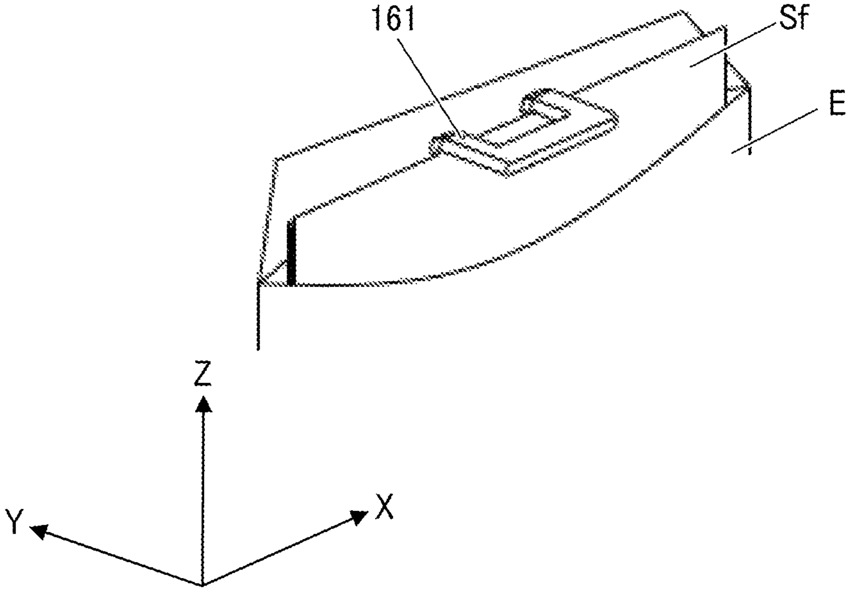
FIG. 22 is a perspective view of a push-in claw included in the envelope processing apparatus, according to an embodiment of the present disclosure.

Next, a description is given of details of the operation of the enclosure pusher 160 with reference to FIGS. 21 and 22. FIG. 21 is a diagram illustrating a state in which the folded sheet Sf as an enclosure is enclosed into the envelope E in the enclosing operation described above. Note that FIG. 21 illustrates an intermediate state between FIGS. 12 and 13.

As illustrated in FIG. 21, the enclosure pusher 160 includes a pushing claw 161, a lift 162, and a slider 163. The pushing claw 161 presses the enclosure into the opening of the envelope E. The lift 162 raises and lowers the pushing claw 161 to push the enclosure into the envelope E. The slider 163 operates the lift 162.

As illustrated in FIG. 22, the pushing claw 161 pushes an end of the folded sheet Sf toward the body of the envelope E.

Returning to FIG. 21, a description is given below. The folded sheet Sf conveyed from the enclosure conveyance passage 1104 to the upper side of the envelope conveyance passage 1105 is lowered on a lateral side of the enclosure pusher 160 and inserted into the opening of the body of the envelope E. After the trailing end of the folded sheet Sf in the insertion direction has passed through the position of the pushing claw 161, the slider 163 moves in the −Z direction. This movement causes the pushing claw 161 to perform an enclosure pushing operation to push the enclosure into the envelope E.

At this time, the envelope processing controller 150 controls the movement amount of the slider 163 to control the lowering amount of the pushing claw 161. The enclosing device 120 according to the present embodiment has at least the "first mode" and the "second mode" as control modes for the lowering amount of the pushing claw 161.

The first mode is a control mode of the enclosure pushing operation in which the lowering amount of the pushing claw 161 is controlled so that the enclosure protrudes outward from the opening of the envelope E.

The second mode is a control mode of the enclosure pushing operation in which the lowering amount of the pushing claw 161 is controlled so that the enclosure does not protrude outward from the opening of the envelope E.

The "state in which the enclosure protrudes outward from the opening of the envelope E" refers to a state in which the enclosure pushed into the envelope E is held at a position where the enclosure extends from the inner side of the body of the envelope E to the outer side of a crease of the flap ef. The "state in which the enclosure does not protrude outward from the opening of the envelope E" refers to a state in which the enclosure pushed into the envelope E is entirely inside the body of the envelope E and the enclosure does not overlap the crease of the flap ef.

That is, when the enclosure pressing operation is performed in the first mode, a part of the enclosure is protruding from the opening of the envelope E. Accordingly, user convenience can be improved by using the first mode in a case where, for example, confirmation of the enclosure or addition of the enclosure is scheduled.

In addition, when the enclosure pushing operation is performed in the second mode, the enclosure does not protrude from the opening of the envelope E. The sealing processing for closing the flap ef is continuously performed so that the enclosing and sealing processing are automatically performed. Thus, user convenience can be improved.

Next, a description is given of the pushing-amount adjustor disposed in the envelope processing apparatus 100, according to the present embodiment. As already described above, the pushing-amount adjustor is configured by cooperation of the controllers (260, 320, 150, and 420). However, the pushing-amount adjustor according to the present embodiment can also be performed by the envelope processing controller 150. That is, the movement amount of the pushing claw 161 is controlled by using the information processing function included in the envelope processing controller 150 and the movement control function of the slider 163 based on selection of an enclosure pushing operation mode and input of setting information in the selected mode as described below.

Figure 23:
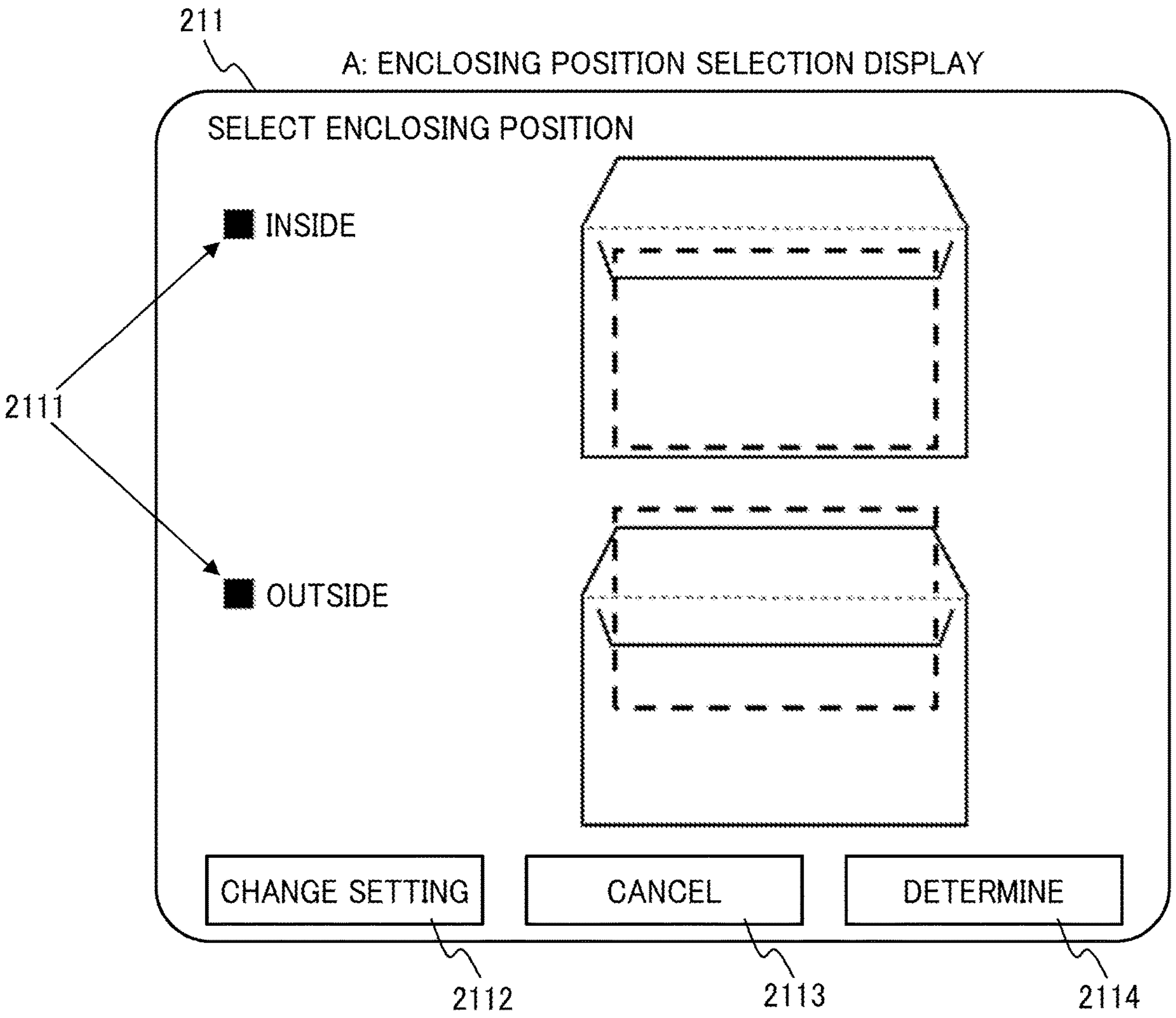
FIG. 23 is a diagram illustrating an example of a pushing-amount adjustor included in the envelope processing apparatus, according to an embodiment of the present disclosure.

FIG. 23 is an example of a user interface performed on the display 210 and the operation unit 220 that have already been described. A first operation screen 211 illustrated in FIG. 23 corresponds to an enclosing-position selection screen with which a user can select any position and set a position at which the folded sheet Sf as an enclosure is enclosed into the envelope E.

In the first operation screen 211, any one of an indication "OUTSIDE" as a setting for performing the enclosing operation so that the enclosure is located at a position protruding outward from the body of the envelope E and an indication "INSIDE" as a setting for performing the enclosing operation so that the enclosure is located at a position not protruding outward from the body of the envelope E can be selected.

That is, when the indication "OUTSIDE" is selected, an operation is performed in which the enclosure is pushed into a position protruding from a bent position of the flap ef of the envelope E. That is, the enclosing operation is completed in a state where a part of the enclosure protrudes from the body of the envelope E.

When the indication "INSIDE" is selected, an operation of pushing the enclosure into the inside of the envelope E is performed. That is, the enclosing operation is completed in a state where the enclosure does not protrude from the body of the envelope E.

Note that an operation mode of the slider 163 set when the indication "OUTSIDE" is selected is referred to as the first mode. An operation mode of the slider 163 set when the indication "INSIDE" is selected is referred to as the second mode.

When any one of selection buttons 2111 for selecting each mode is operated in the first operation screen 211, the state turns to a setting ready state of the first mode or the second mode. When a setting change button 2112 is selected in the setting state, the screen transitions to a second operation screen 212 illustrated in FIG. 24. At this stage, the mode selection is determined.

When a cancel button 2113 is selected, the selected state is canceled. When a determination button 2114 is selected, a mode in which the selection is determined is set.

Figure 24:
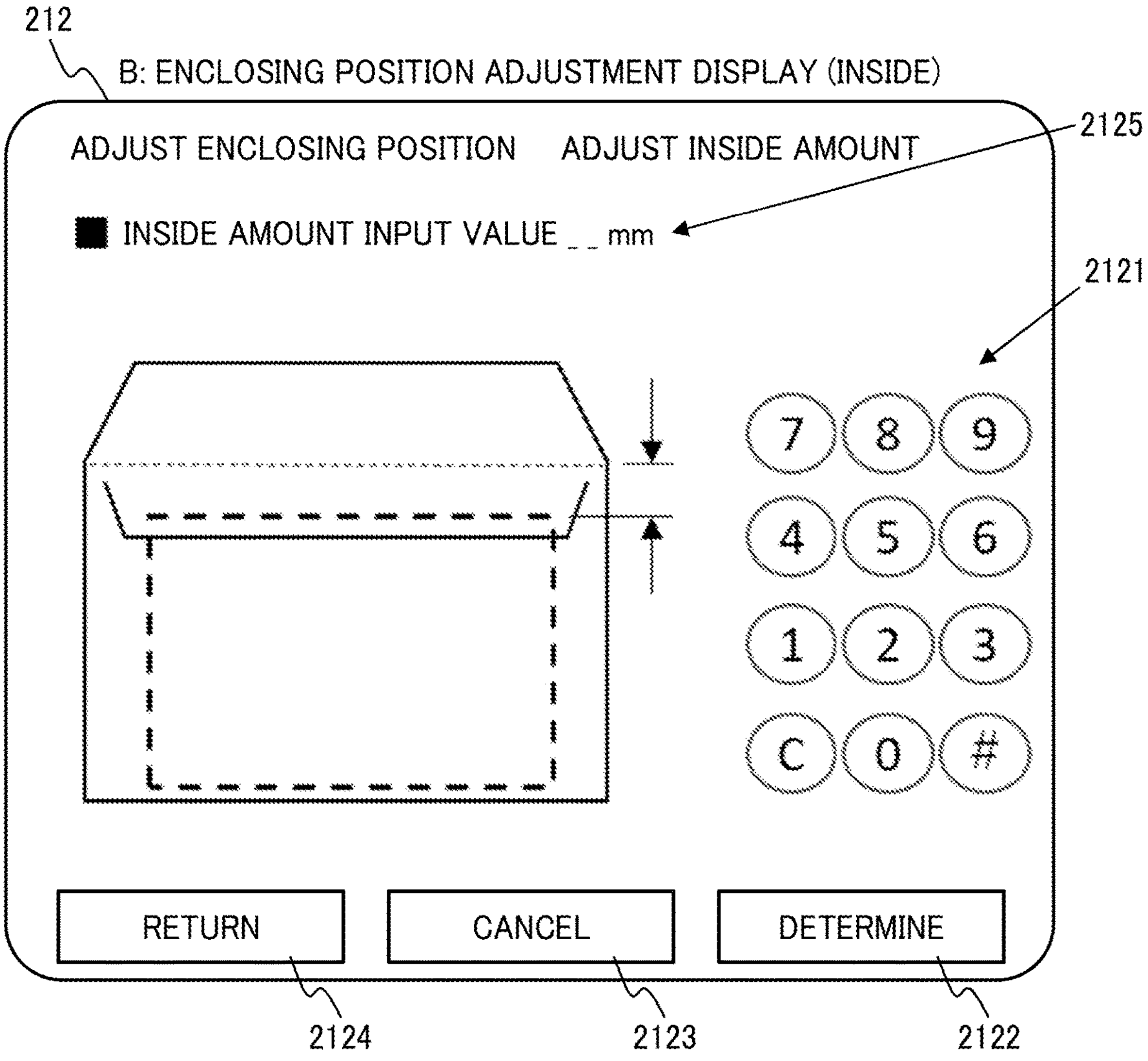
FIG. 24 is a diagram illustrating another example of the pushing-amount adjustor included in the envelope processing apparatus.
Figure 25:
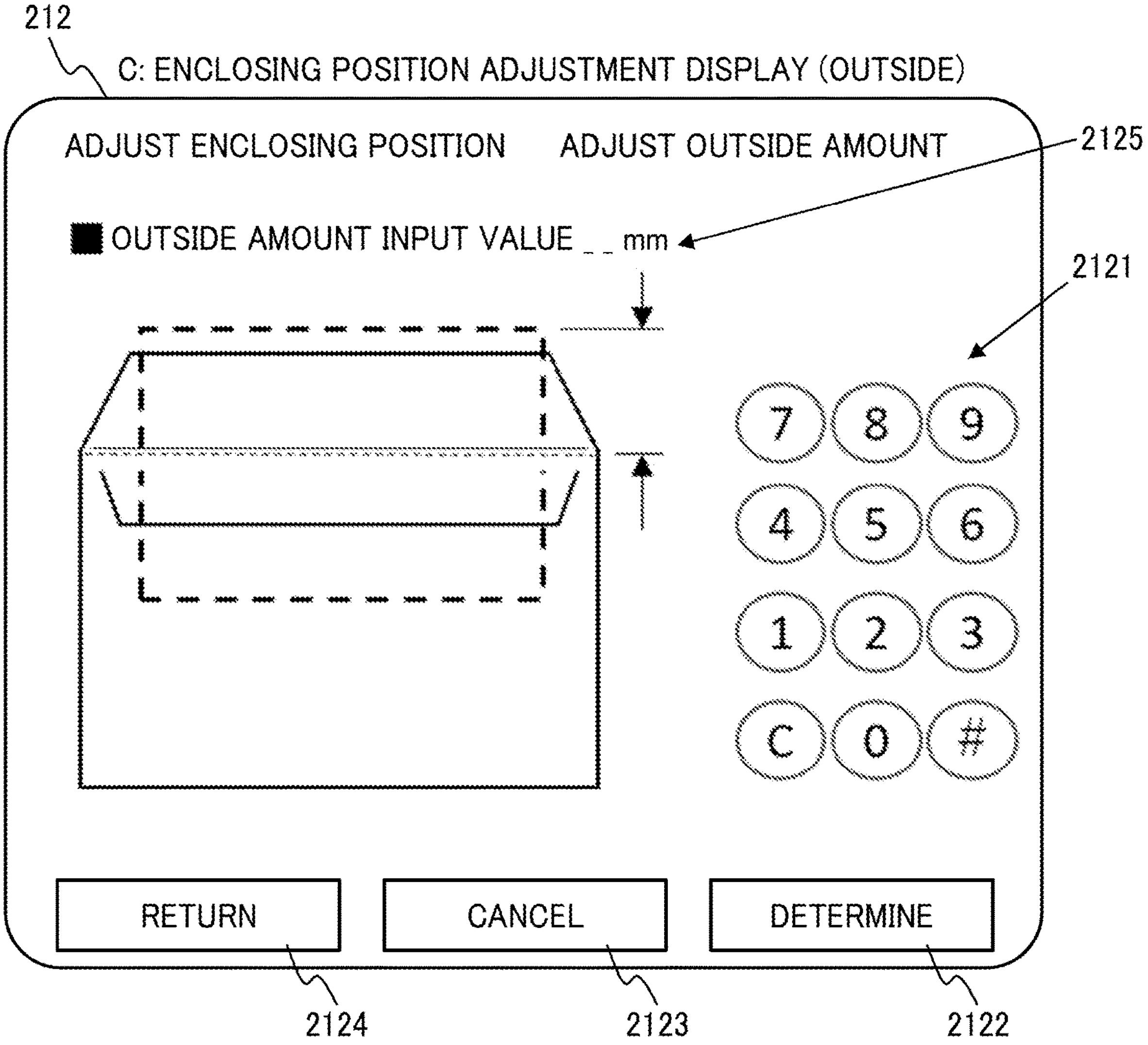
FIG. 25 is a diagram illustrating still another example of the pushing-amount adjustor included in the envelope processing apparatus.

The second operation screen 212 illustrated in FIG. 24 is an example of a screen on which a setting is performed so that a position at which the folded sheet Sf as an enclosure is enclosed in the envelope E is set to be "INSIDE". The second operation screen 212 illustrated in FIG. 25 is an example of a screen on which a setting is performed so that a position at which the folded sheet Sf as an enclosure is enclosed in the envelope E is set to be "OUTSIDE". Either of the screens corresponds to an enclosing-position adjustment screen with which a user can set any pushing amount of an enclosure into the envelope E.

In the second operation screen 212 illustrated in FIG. 24, a predetermined inside amount (pushing amount) at the selection of the second mode (INSIDE) can be set as a distance from the flap ef. For example, a numeric keypad 2121 as an adjustment-amount input unit included in the second operation screen 212 is operated to input a distance (an input value of the inside amount). The input value is displayed on an input display field 2125 as a display means. A user operates a determination button 2122 to set any pushing amount of the enclosure into the envelope E. The screen transitions to a main screen.

The envelope processing controller 150 controls the movement amount of the pushing claw 161 based on the pushing amount input in the second operation screen 212. Note that when a cancel button 2123 indicating "CANCEL" in the second operation screen 212 is operated, the input value is erased to be a state in which a user can re-enter.

When a return button 2124 indicating "RETURN" in the second operation screen 212 is operated, the screen returns to the first operation screen 211.

The envelope processing apparatus 100 according to the present embodiment described above is likely to respond to various needs of users, such as checking contents (enclosures) enclosed in the envelope E and adding enclosures. That is, the envelope processing apparatus 100 has a function of performing the enclosing operation so that the enclosure pops out (protrudes) from the envelope E. Thus, confirmation work such as work to take out about half of the enclosure once from the envelope E for confirmation of the enclosure or addition of the enclosure can be omitted. As a result, efficiency of the enclosing operation can be improved. An enclosure may be completely enclosed in the envelope E to enable adapting to workflows of various users and responding to various needs.

Aspects of the present disclosure are, for example, as follows.

First Aspect

In a first aspect, an envelope processing apparatus (e.g., the envelope processing apparatus 100) inserts an enclosure into an envelope (e.g., the envelope E) and includes an envelope conveyor (e.g., the first vertical conveying roller pair 122 or the second vertical conveying roller pair 123), a flap opener (e.g., the flap opening mechanism 128), an enclosure pusher (e.g., the enclosure pusher 160), and a pushing-amount adjustor (e.g., the controller 150). The envelope conveyor (e.g., the first vertical conveying roller pair 122 or the second vertical conveying roller pair 123) extends in a vertical direction and conveys the envelope (e.g., the envelope E) to an enclosing position via an envelope conveyance passage (e.g., the envelope conveyance passage 1105) as a passage in which the envelope (e.g., the envelope E) is conveyed. The flap opener (e.g., the flap opening mechanism 128) opens a flap of the envelope (e.g., the envelope E). The enclosure pusher (e.g., the enclosure pusher 160) pushes the enclosure toward an opening of a body of the envelope (e.g., the envelope E) conveyed to the enclosing position with the flap open. The pushing-amount adjustor (e.g., the controller 150) changes a pushing amount of the enclosure into the envelope (e.g., the envelope E) and adjusts the pushing amount based on the opening of the body of the envelope (e.g., the envelope E) within a specified range from an inside to an outside of the body of the envelope (e.g., the envelope E).

Second Aspect

In a second aspect, in the envelope processing apparatus (e.g., the envelope processing apparatus 100) according to the first aspect, the pushing-amount adjustor (e.g., the controller 150) performs a first mode for adjusting the pushing amount such that the enclosure is placed at a position where the enclosure protrudes outward from the body of the envelope (e.g., the envelope E) by a specified amount.

Third Aspect

In a third aspect, in the envelope processing apparatus (e.g., the envelope processing apparatus 100) according to the first or second aspect, the pushing-amount adjustor (e.g., the controller 150) performs a second mode for adjusting the pushing amount such that the enclosure is placed at a position where the enclosure does not protrude outward from the body of the envelope (e.g., the envelope E).

Fourth Aspect

In a fourth aspect, the envelope processing apparatus (e.g., the envelope processing apparatus 100) according to any one of the first to third aspects, further includes a sealer (e.g., the sealer 130) that seals the envelope (e.g., the envelope E) in which the enclosure is inserted.

Fifth Aspect

In a fifth aspect, an image forming system (e.g., the print system 1) includes an image forming apparatus (e.g., the image forming apparatus 200) that forms an image onto a sheet medium and the envelope processing apparatus (e.g., the envelope processing apparatus 100) according to any one of the first to fourth aspects that inserts the sheet medium as the enclosure into the envelope (e.g., the envelope E).

Sixth Aspect

In a sixth aspect, in the image forming system (e.g., the print system 1) according to the fifth aspect, the image forming apparatus (e.g., the image forming apparatus 200) includes a display (e.g., the display 210). The pushing-amount adjustor (e.g., the controller 150) causes the display (e.g., the display 210) to display a screen for inputting an adjustment value of the pushing amount confirming the adjustment value input.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An envelope processing apparatus configured to insert an enclosure into an envelope, the envelope processing apparatus comprising:

an envelope conveyor extending in a vertical direction, the envelope conveyor configured to convey the envelope to an enclosing position via an envelope conveyance passage as a passage in which the envelope is conveyed;

a flap opener configured to open a flap of the envelope;

an enclosure pusher configured to push the enclosure toward an opening of a body of the envelope conveyed to the enclosing position with the flap open; and circuitry configured to:

change a pushing amount of the enclosure pushed into the envelope in an inserting direction in which the enclosure is inserted into the envelope; and adjust an inserting length of the enclosure relative to the opening of the body of the envelope by changing the pushing amount in the inserting direction while the enclosure is inserted into the envelope in a normal state.

2. The envelope processing apparatus according to claim 1, wherein the circuitry is configured to perform a mode for adjusting the inserting length such that the enclosure is placed at a position where the enclosure protrudes from the body of the envelope toward upstream in the inserting direction by a specified amount.

3. The envelope processing apparatus according to claim 1, wherein the circuitry is configured to perform a mode for adjusting the inserting length such that the enclosure is placed at a position where the enclosure does not protrude from the body of the envelope toward upstream in the inserting direction.

4. The envelope processing apparatus according to claim 1, further comprising a sealer configured to seal the envelope in which the enclosure is inserted.

5. An image forming system comprising:

an image forming apparatus configured to form an image onto a sheet medium; and the envelope processing apparatus according to claim 1, configured to insert the sheet medium as the enclosure into the envelope.

6. The image forming system according to claim 5, wherein the image forming apparatus includes a display, and wherein the circuitry is configured to cause the display to display a screen for inputting an adjustment value of the pushing amount and confirming an adjustment value input.

7. The envelope processing apparatus according to claim 1, wherein the circuitry is configured to complete an enclosing operation in a state where a part of the enclosure protrudes from the body of the envelope.

8. The envelope processing apparatus according to claim 1, wherein the circuitry is configured to switch between a first mode and a second mode for adjusting the inserting length, the first mode configured such that the enclosure is placed at a position where the enclosure protrudes from the body of the envelope toward upstream in the inserting direction by a specified amount, the second mode configured such that the enclosure is placed at a position where the enclosure does not protrude from the body of the envelope toward upstream in the inserting direction.

* * * * *